(12) United States Patent
Zhang et al.

(10) Patent No.: US 12,377,554 B2
(45) Date of Patent: Aug. 5, 2025

(54) CLEANING ROBOT

(71) Applicant: Qfeeltech (Beijing) Co., Ltd., Beijing (CN)

(72) Inventors: Yiming Zhang, Beijing (CN); Zhen Chen, Beijing (CN)

(73) Assignee: QFEELTECH (BEIJING) CO., LTD., Beijing (CN)

( * ) Notice: Subject to any disclaimer, the term of this patent is extended or adjusted under 35 U.S.C. 154(b) by 0 days.

(21) Appl. No.: 18/738,524

(22) Filed: Jun. 10, 2024

(65) Prior Publication Data

US 2024/0326259 A1  Oct. 3, 2024

Related U.S. Application Data

(63) Continuation of application No. 18/295,474, filed on Apr. 4, 2023, now Pat. No. 12,042,926, which is a
(Continued)

(30) Foreign Application Priority Data

Jan. 24, 2018  (CN) .......................... 201810067512.8

(51) Int. Cl.
*B25J 11/00*  (2006.01)
*B25J 9/16*  (2006.01)
(Continued)

(52) U.S. Cl.
CPC ......... *B25J 11/0085* (2013.01); *B25J 9/1676* (2013.01); *B25J 13/089* (2013.01);
(Continued)

(58) Field of Classification Search
CPC ...... B25J 11/0085; B25J 19/023; B25J 19/04; B25J 19/161; B25J 9/1676; B25J 13/089;
(Continued)

(56) References Cited

U.S. PATENT DOCUMENTS 9,339,163 B2  5/2016  Noh et al.
9,519,289 B2  12/2016  Munich et al.
(Continued)

FOREIGN PATENT DOCUMENTS

CN  204618113 U  9/2015
CN  205889214 U  1/2017
(Continued)

OTHER PUBLICATIONS

International Search Report and Written Opinion issued on Aug. 10, 2018, in International Application No. PCT/CN2018/088143, filed May 24, 2018, and English translations thereof.
(Continued)

*Primary Examiner* — Khoi H Tran
*Assistant Examiner* — Nhi Q Bui
(74) *Attorney, Agent, or Firm* — MILLBURN IP PLLC

(57) ABSTRACT

A cleaning robot is provided. The cleaning robot includes a motion device configured to move the cleaning robot in an environment, and an exterior housing. The cleaning robot also includes a motion sensor configured to obtain parameters relating to a motion of the cleaning robot, and a storage device configured to store data including at least one of the one or more images or the one or more motion parameters. The cleaning robot also includes a camera configured to capture one or more images of the environment. The camera is disposed internal to a slant surface located at a front end of the exterior housing and is pivotable relative to the slant surface. The slant surface inclines upwardly with respect to a forward moving direction. The camera and the slant surface face substantially a same direction. A direction of the camera and the forward moving direction form an acute angle.

9 Claims, 17 Drawing Sheets

Related U.S. Application Data continuation of application No. 16/921,095, filed on Jul. 6, 2020, now Pat. No. 11,654,574, which is a continuation-in-part of application No. PCT/CN2018/088143, filed on May 24, 2018.

(51) Int. Cl.

| | |
|---|---|
| *B25J 13/08* | (2006.01) |
| *B25J 19/02* | (2006.01) |
| *B25J 19/04* | (2006.01) |
| *G05D 1/00* | (2006.01) |
| *G05D 1/246* | (2024.01) |
| *G05D 1/249* | (2024.01) |

(52) U.S. Cl.
CPC ............ *B25J 19/023* (2013.01); *B25J 19/04* (2013.01); *G05D 1/0246* (2013.01); *G05D 1/0274* (2013.01); *G05D 1/246* (2024.01); *G05D 1/249* (2024.01)

(58) Field of Classification Search
CPC ............ A47L 2201/04; A47L 2201/06; A47L 11/4061; A47L 11/4011; G05D 1/0246; G05D 1/0274; G05D 1/246; G05D 1/249; G05D 1/0219
See application file for complete search history.

(56) References Cited

U.S. PATENT DOCUMENTS

| | | |
|---|---|---|
| 9,630,319 B2 | 4/2017 | Vicenti |
| 9,764,472 B1 | 9/2017 | Ebrahimi Afrouzi et al. |
| 9,844,876 B2 * | 12/2017 | Chung .................. B25J 9/1664 |
| 9,868,211 B2 | 1/2018 | Williams et al. |
| 10,583,562 B2 | 3/2020 | Stout et al. |
| 10,639,793 B2 | 5/2020 | Williams et al. |
| 2011/0194755 A1 * | 8/2011 | Jeong ........................ G06T 7/77 901/1 |
| 2015/0367512 A1 | 12/2015 | Hong et al. |
| 2017/0239813 A1 * | 8/2017 | Vicenti .................. G05D 1/622 |
| 2018/0050634 A1 * | 2/2018 | White .................. A47L 7/0085 |
| 2018/0267552 A1 * | 9/2018 | Artes ..................... G05D 1/246 |

FOREIGN PATENT DOCUMENTS

| | | |
|---|---|---|
| CN | 106805856 A | 6/2017 |
| CN | 206414227 U | 8/2017 |
| CN | 107544507 A | 1/2018 |
| CN | 107569181 A | 1/2018 |
| CN | 207424680 U | 5/2018 |
| CN | 304727241 S | 7/2018 |
| CN | 109984678 A | 7/2019 |
| CN | 109984689 A | 7/2019 |
| KR | 20110010329 A | 2/2011 |
| WO | 2017/018848 A1 | 2/2017 |

OTHER PUBLICATIONS

First Office Action issued on Oct. 9, 2019, in Chinese Patent Application No. 201810067512.8, filed on Jan. 24, 2018, and partial English translation thereof (20 pages).

Second Office Action issued on Jul. 1, 2020, in Chinese Patent Application No. 201810067512.8, filed on Jan. 24, 2018, and partial English translation thereof (19 pages).

* cited by examiner

CLEANING ROBOT

CROSS-REFERENCE TO RELATED APPLICATIONS

This application is a continuation of U.S. patent application Ser. No. 18/295,474, filed on Apr. 4, 2023, which is a continuation of U.S. patent application Ser. No. 16/921,095, filed on Jul. 6, 2020, which is a continuation-in-part of International Application No. PCT/CN2018/088143, filed on May 24, 2018, which claims priority to Chinese Patent Application No. 201810067512.8, filed on Jan. 24, 2018. All of the above-mentioned applications are incorporated herein by reference in their entirety.

TECHNICAL FIELD

The present disclosure generally relates to the technical field of artificial intelligence and robots and, more specifically, to a cleaning robot.

BACKGROUND

In recent years, cleaning robots have been rapidly developed and have become popular home appliances. For cleaning robots, the most important objective is to achieve comprehensive and highly efficient cleaning of an unknown environment, such as a floor. Currently, most of the cleaning robots available on the market have the following issues: first, a frequently used random cleaning mode of a cleaning robot often misses a large number of uncleaned zones, and the cleaning robot often repeatedly cleans already cleaned zones, which can result in a low cleaning efficiency; second, some newly developed cleaning robots rely on expensive distance measuring devices, such as Light Detection and Ranging ("Lidar") sensors, or laser-based Simultaneous Localization and Mapping ("SLAM") technologies to realize mapping, localization, and navigation in an actual work zone. On one hand, a Lidar sensor is expensive, which adds to the total cost of a cleaning robot (e.g., a floor cleaning robot). On the other hand, the volume of a Lidar sensor is large, which increases the overall volume and weight of the cleaning robot if one or more Lidar sensors are used.

SUMMARY

According to an aspect of the present disclosure, a cleaning robot is provided. The cleaning robot includes one or more motion devices configured to move the cleaning robot in an environment. The cleaning robot also includes an exterior housing. The cleaning robot also includes one or more motion sensors configured to obtain one or more motion parameters relating to a motion of the cleaning robot. The cleaning robot also includes a storage device configured to store data including at least one of the one or more images or the one or more motion parameters. The cleaning robot also includes a camera configured to capture one or more images of the environment. The camera is disposed internal to a slant surface located at a front end of the exterior housing and is pivotable relative to the slant surface. The slant surface inclines upwardly with respect to a forward moving direction. The camera and the slant surface face substantially a same direction. A direction of the camera and the forward moving direction form an acute angle in a range greater than or equal to 30° and less than 90°. The cleaning robot also includes one or more cleaning devices configured to clean a floor. The cleaning robot further includes a power source configured to provide an electric power to the cleaning robot.

According to another aspect of the present disclosure, a non-transitory computer-readable storage medium is provided. The non-transitory computer-readable storage medium stores computer-executable instructions, which when executed by a processor, are configured to cause the processor to perform a method. The method includes setting a virtual zone inside a work zone. The method also includes controlling a cleaning robot to move to a location inside the virtual zone or at a boundary of the virtual zone. The method also includes controlling the cleaning robot to move inside the virtual zone and clean the virtual zone. The method also includes dividing, based on the virtual zone, a zone in the work zone and outside of the virtual zone to obtain a plurality of expanded virtual zones. The method further includes based on a determination that the cleaning robot has finished cleaning the virtual zone, determining a first expanded virtual zone to be cleaned subsequently from the expanded virtual zones based on distances between the expanded virtual zones and a current location of the cleaning robot when the cleaning robot finishes cleaning the virtual zone.

Other aspects of the present disclosure can be understood by those skilled in the art in light of the description, the claims, and the drawings of the present disclosure. The foregoing general description and the following detailed description are exemplary and explanatory only and are not restrictive of the claims.

BRIEF DESCRIPTION OF THE DRAWINGS

To more clearly explain the technical solutions of the present disclosure, the embodiments of the present disclosure will be described with reference to the accompanying drawings. The accompanying drawings described below merely show some embodiments of the present disclosure. A person having ordinary skills in the art can derive other embodiments based on the accompanying drawings and the principles disclosed herein. In the drawings.

DETAILED DESCRIPTION

Figure 1A:
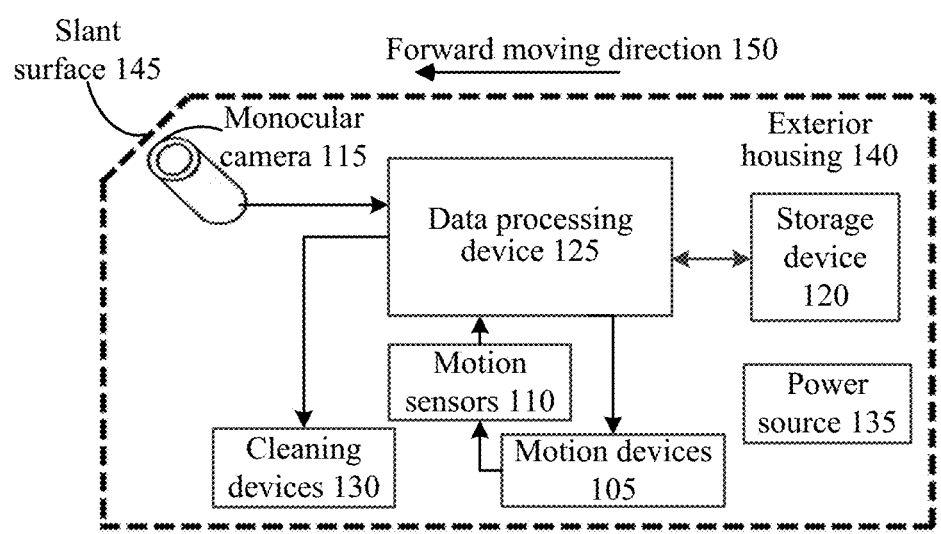
FIG. 1A illustrates a schematic diagram of a cleaning robot, according to an embodiment of the present disclosure.

To more clearly explain the technical features and effects of the present disclosure, the embodiments will be further explained in detail with reference to the accompanying drawings. The embodiments described herein are some embodiments of the present disclosure. The present disclosure may be implemented in other different embodiments within the principles disclosed herein. Any equivalent variations or substitutions of the disclosed embodiments made by a person having ordinary skills in the art within the scope of the claims all fall within the scope of protection of the present disclosure.

In the present descriptions, terms such as "an embodiment," "a specific embodiment," or "for example" mean that the specific features, structures, materials, or characteristics described in the embodiment or example are included in at least one embodiment or example of the present disclosure. The above-mentioned terms do not necessarily indicate that the embodiments or examples are the same embodiments or examples. In addition, the specific features, structures, materials, or characteristics described herein may be combined in a suitable manner in one or more embodiments or examples. The order of execution of the steps included in various embodiments are merely illustrative for implementing the present disclosure. The order of execution of the steps is not limited by the present disclosure, which can be adjusted in a suitable manner based on application needs.

As used herein, the terms "couple," "coupling," "coupled," "connect," "connection," "connected," or the like may encompass any suitable mechanical, electrical, electromagnetic coupling or connection. The coupling or connection may be wireless or wired. The coupling or connection may be direct or indirect.

The phrase "at least one of A or B" may encompass all combinations of A and B, such as A only, B only, or A and B. Likewise, the phrase "at least one of A, B, or C" may encompass all combinations of A, B, and C, such as A only, B only, C only, A and B, A and C, B and C, or A and B and C. The phrase "A and/or B" may be interpreted in a manner similar to that of the phrase "at least one of A or B." For example, the phrase "A and/or B" may encompass all combinations of A and B, such as A only, B only, or A and B. Likewise, the phrase "A, B, and/or C" has a meaning similar to that of the phrase "at least one of A, B, or C." For example, the phrase "A, B, and/or C" may encompass all combinations of A, B, and C, such as A only, B only, C only, A and B, A and C, B and C, or A and B and C.

The present disclosure provides a cleaning robot. By including a camera (e.g., a monocular camera) mounted at a front end of the cleaning robot at an acute elevation angle relative to a forward moving direction, the accuracy of the localization and mapping of the cleaning robot based on images captured by the camera can be enhanced, thereby improving the path planning/navigation effects of the cleaning robot. The disclosed technical solution can resolve the low efficiency issue associated with the typical random cleaning mode of a conventional cleaning robot. In the meantime, the disclosed cleaning robot provides improved object recognition effect and object avoidance effect. Moreover, the camera may be a monocular camera having a simple structure. As a result, the disclosed cleaning robot can achieve a high cleaning efficiency at a low cost. Furthermore, the disclosed cleaning robot can realize various functions in addition to the cleaning function, such as object recognition, facial recognition, real time surveillance, security surveillance, etc., thereby expanding the applications of the cleaning robot.

In some embodiments, a cleaning robot of the present disclosure may include: one or more motion devices, one or more motion sensors, a camera (e.g., a monocular camera), a storage device, a data processing device, one or more cleaning devices, a power source, and an exterior housing. The one or more motion devices may be configured to move the cleaning robot on a floor. The one or more motion sensors may be configured to obtain one or more motion parameters relating to a motion of the cleaning robot while the cleaning robot is moved by the one or more motion devices. The camera (e.g., monocular camera) may be configured to capture one or more images of an environment (e.g., a room) in which the cleaning robot operates. The camera may be disposed internal to (e.g., disposed behind and under) a slant surface that inclines upwardly relative to a forward moving direction of the cleaning robot (e.g., the slant surface may form an obtuse angle with respect to the forward moving direction). The slant surface may be disposed at a front end of the exterior housing. That is, the slant surface may function as a cover disposed in front of, and over, the camera to protect the camera. The camera and the slant surface may face substantially the same direction. A direction of the camera (e.g., an optical axis direction of a lens of the camera) and the forward moving direction of the cleaning robot may form an acute angle. In some embodiments, the camera may be separately disposed from the slant surface, and a lens of the camera may be pivotable relative to the slant surface (e.g., an angle between an optical axis of the lens and the slant surface may be variable). In some embodiments, the camera may be disposed at least partially in a back side of the slant surface, or may be disposed in a through hole in the slant surface. For example, in some embodiments, a lens of the camera may be at least partially disposed in a depressed portion formed at the back side of the slant surface. In some embodiments, the lens of the camera may be mechanically coupled with the slant surface, and the camera and the slant surface may be pivotable together to change an inclination angle of the slant surface and the camera.

The storage device may be connected with the data processing device, and may be configured to store data or information. The data processing device may be configured to obtain the one or more images captured by the camera, and the one or more motion parameters acquired by the one or more motion sensors. The data processing device may perform localization, mapping, and path planning for the cleaning robot based on a localization and mapping algorithm. In some embodiments, the location and mapping algorithm may include instructions for controlling the movement and operations of the cleaning robot. The data processing device may execute the localization and mapping algorithm to control the one or more motion devices of the cleaning robot to move along a planned path generated from the path planning. The one or more cleaning devices may be configured to clean the floor. The data processing device may control the operations of the one or more cleaning devices to clean the floor while controlling the one or more motion devices to move the cleaning robot along the planned path in the environment.

In some embodiments, protection edges may be provided at the front end of the exterior housing to protect the camera. For example, protection edges protruding forwardly and higher than the slant surface may be disposed at portions of the front end at the left and right sides of the slant surface.

In some embodiments, the camera may be configured to be rotatable or pivotable in a vertical plane formed by a normal of the slant surface and the forward moving direction of the cleaning robot. In some embodiments, during a cleaning process, the data processing device may control the camera to pivot in the vertical plane to adjust the elevation angle of the camera, such that more features on the floor or more features at a ceiling may be captured. In some embodiments, the camera may be rotatable or pivotable in a horizontal plane (e.g., a plane parallel with a floor plane), such that the direction of the camera may be rotated horizontally relative to the slant surface.

In some embodiments, the cleaning robot may also include a communication device configured to be communicatively connected (e.g. through a wireless connection or a wired connection) with a server. The data processing device may transmit information (e.g., data or commands) to the server through the communication device, and/or obtain information (e.g., data or commands) from the server through the communication device.

In some embodiments, the communication device included in the cleaning robot may be communicatively connected (e.g., through a wireless connection or a wired connection) with a user terminal device. The data processing device may receive information (e.g., data or commands) from the user terminal device through the communication device, and/or transmit information (e.g., data or commands) to the user terminal device through the communication device.

In some embodiments, the cleaning robot may also include a microphone and/or a speaker. The microphone may be configured to obtain a voice control command and transmit the voice control command to the data processing device. The speaker may transmit audio information to an external environment.

In some embodiments, the slant surface may be covered by, may include, or may be made of a light transmissive material (e.g., a light transparent material). For example, in some embodiments, the slant surface may be a slant panel or plate made of a light transparent material.

In some embodiments, the light transmissive material may include one or more of a general purpose polystyrene ("GPPS"), transparent acrylonitrile butadiene styrene ("ABS"), acrylonitrile styrene resin ("AS"), poly (methyl methacrylate) ("PMMA"), polycarbonate ("PC"), and polystyrene ("PS").

In some embodiments, the direction of the camera may coincide or be parallel with a direction of a normal of the slant surface.

In some embodiments, an angle $\beta$ (i.e., the elevation angle) formed by the direction of the camera and the forward moving direction of the cleaning robot may be within a range of $30°\leq\beta\leq90°$.

In some embodiments, a vertical field of view of the camera may be in a range of 50° to 100°.

In some embodiments, the localization and mapping algorithm may include instructions for the following operations:
  recognizing feature information included in at least two images captured by the camera; and
  computing displacements and poses of the cleaning robot based on one or more motion parameters relating to a motion of the cleaning robot obtained by the one or more motion sensors at time instances when the at least two images are captured and based on the feature information, and computing a location of the cleaning robot at each time instance when each of the at least two images is captured, thereby realizing the localization of the cleaning robot.

In some embodiments, the cleaning robot may include a collision sensor. The collision sensor may be disposed at the front end of the cleaning robot. When the cleaning robot collides with an obstacle, the collision sensor may generate a collision signal and transmit the collision signal to the data processing device. In some embodiments, the collision sensor may be mounted behind the front end of the exterior housing of the cleaning robot. In some embodiments, the cleaning robot may include two or more collision sensor mounted at different portions of the cleaning robot to detect collisions.

In some embodiments, the localization and mapping algorithm may also include instructions for the following operations:
  when the cleaning robot collides with the obstacle, determining a location of the obstacle based on the collision signal provided by the collision sensor and a location of the cleaning robot at a time instance the collision signal is generated; and
  building a map of a work zone based on the location of the obstacle.

In some embodiments, the cleaning robot may also include a distance sensor. The distance sensor may be configured to measure a distance from the cleaning robot to an object located in the environment in which the cleaning robot operates, and may detect an obstacle in the environment based on the measured distance. When the distance sensor detects the obstacle, the distance sensor may obtain a relative position of the obstacle relative to the cleaning robot and transmit the relative position of the obstacle to the data processing device. In some embodiments, one or more distance sensors may be mounted at the top, front end, sides, and/or back end of the cleaning robot to measure the distances from the objects in the environment to the cleaning robot. In some embodiments, the distances measured by the distance sensors may be used for localization, mapping, object avoidance (or obstacle avoidance), and path planning purposes.

In some embodiments, the localization and mapping algorithm may also include instructions for the following operations:

determining a location of the obstacle in the environment based on the relative position of the obstacle transmitted from the distance sensor and a location of the cleaning robot in the environment at a time instance when the distance sensor obtains the relative position of the obstacle; and building the map of the work zone based on the location of the obstacle.

In some embodiments, the localization and mapping algorithm may also include instructions for the following operations:

setting a virtual zone, and controlling the cleaning robot to move to a location inside the virtual zone or at a boundary of the virtual zone. In some embodiments, setting the virtual zone may include controlling a moving distance and/or a rotating angle (or turning angle) of the cleaning robot to cause a moving path of the cleaning robot inside an actual work zone to form a closed space that defines the virtual zone; and controlling the cleaning robot to move inside the virtual zone and clean the virtual zone located inside the actual work zone.

In some embodiments, controlling the cleaning robot to move inside the virtual zone and clean the virtual zone located inside the actual work zone may include:

controlling the cleaning robot to move inside an interior of the closed space and clean the interior of the closed space based on a predetermined cleaning pattern.

In some embodiments, the localization and mapping algorithm may also include instructions for the following operations:

during the process of controlling the moving distance and/or the rotating angle of the cleaning robot to obtain the closed space, based on a determination that the cleaning robot encounters an obstacle (e.g., based on signals received from the collision sensor and/or the distance sensor), controlling the cleaning robot to turn in a predetermined turning direction and move along a periphery of the obstacle; computing, in real time, a sum of a projected distance of a moving path along the periphery of the obstacle projected in a predetermined moving direction and a distance the cleaning robot already traversed in the predetermined moving direction prior to or when encountering the obstacle, wherein the predetermined moving direction may be a moving direction in which the cleaning robot was moving when encountering the obstacle; and based on a determination that the computed sum is greater than or equal to a predetermined distance in the predetermined moving direction, continuing to control the moving distance and/or rotating angle of the cleaning robot. For example, when the computed sum is greater than or equal to the predetermined distance in the predetermined moving direction, the data processing device may control the cleaning robot to turn to a direction perpendicular to the predetermined moving direction, rather than continuing to move along the periphery of the obstacle. The cleaning robot encountering the obstacle means that the cleaning robot is located within a predetermined distance from the obstacle (e.g., as detected by the distance sensor), or is in contact with the obstacle (e.g., as detected by the collision sensor).

In some embodiments, controlling the cleaning robot to clean the interior of the closed space may include:

S510: controlling the cleaning robot to move in a first cleaning direction inside the virtual zone until the cleaning robot encounters a first boundary of the virtual zone or a first boundary of a cleaned zone. The term "cleaning direction" means a moving direction of the cleaning robot while the cleaning robot cleans the floor. Various methods may be used to determine that the cleaning robot encounters a boundary of the virtual zone or a boundary of the cleaned zone. For example, it may be determined that the cleaning robot has encountered a boundary of the virtual zone or a boundary of the cleaned zone when a relative distance from the cleaning robot to a boundary of the virtual zone or a boundary of the cleaned zone is within a predetermined distance. In some embodiments, coordinates of the cleaning robot may be compared with coordinates of virtual points that define the virtual zone or virtual points that define the cleaned zone. When a difference in coordinates in one or more coordinate system directions is smaller than a predetermined value, it may be determined that the cleaning robot has encountered a boundary of the virtual zone or a boundary of the cleaned zone. In some embodiments, cleaned/uncleaned status indicators of virtual points defining a boundary of a cleaned zone may be stored in a data storage device, and may be retrieved and used to determine whether a current location of the cleaning robot is at a boundary of a cleaned zone.

S520: controlling the cleaning robot to turn in a first turning direction to a first deviation direction that is substantially parallel with a direction of a first encountered boundary, continue to move in the first deviation direction for a first deviation distance, and turn in the first turning direction to a second cleaning direction parallel with and opposite to the first cleaning direction. The first encountered boundary may be the first boundary of the virtual zone or the first boundary of the cleaned zone.

S530: controlling the cleaning robot to move in the second cleaning direction inside the virtual zone until the cleaning robot encounters a second boundary of the virtual zone or a second boundary of the cleaned zone;

S540: controlling the cleaning robot to turn in a second turning direction to a second deviation direction that is substantially parallel with a direction of a second encountered boundary, continue to move in the second deviation direction for a second deviation distance, and turn in the second turning direction to the first cleaning direction. The second encountered boundary may be the second boundary of the virtual zone or the second boundary of the cleaned zone.

S550: repeating steps S510 to S540, until a coverage of the moving path of the cleaning robot exceeds a predetermined percentage of a traversable area of the virtual zone. For example, the predetermined percentage may be 70%, 75%, 80%, 85%, 90%, 95%, etc., which may be determined based on application needs. In some embodiments, the steps S510 to S540 may be repeated until the data processing device determines that the cleaning robot is surrounded by one or more boundaries of the virtual zone, one or more boundaries of one or more cleaned zones, or one or more obstacles. In some embodiments, all sides of the cleaning robot (e.g., left side, right side, front, back) (or about 360° around the cleaning robot 100) may be surrounded by one or more boundaries of the virtual zone, one or more boundaries of one or more cleaned zones, or one or more obstacles. In some embodiments, less than 360° around the cleaning robot 100 may be surrounded by one or more boundaries of the virtual zone, one or more boundaries of one or more cleaned zones, or one or more obstacles.

In some embodiments, the first deviation distance and/or the second deviation distance are substantially the same as or slightly greater than a width of the one or more cleaning devices.

In some embodiments, the localization and mapping algorithm may also include instructions for the following operations: based on a determination that the cleaning robot encounters an obstacle while controlling the cleaning robot to move in a predetermined cleaning direction inside the virtual zone, controlling the cleaning robot to move along a periphery of the obstacle; computing, in real time, a projected distance of a moving path along the periphery of the obstacle projected in a direction perpendicular to the predetermined cleaning direction; based on a determination that the projected distance is equal to or greater than a third deviation distance, controlling the cleaning robot to turn to a new cleaning direction opposite to the predetermined cleaning direction and to continue to move in the new cleaning direction; or based on a determination that the projected distance is substantially equal to 0, controlling the cleaning robot to turn to the predetermined cleaning direction to continue to move in the predetermined cleaning direction.

In some embodiments, the localization and mapping algorithm may also include instructions for the following operations:

dividing, based on the virtual zone, a zone inside the actual work zone and outside of the virtual zone to obtain a plurality of expanded virtual zones; and based on a determination that the cleaning robot finishes cleaning a current virtual zone, controlling the cleaning robot to clean the plurality of expanded virtual zones sequentially.

In some embodiments, dividing the zone inside the actual work zone and outside of the virtual zone to obtain the plurality of expanded virtual zones may include replicating the virtual zone in the zone inside the actual work zone and outside of the virtual zone to form the plurality of expanded virtual zones.

In some embodiments, controlling the cleaning robot to clean the plurality of expanded virtual zones sequentially may include: based on distances between the expanded virtual zones and a current location of the cleaning robot when the cleaning robot finishes cleaning the current virtual zone, determining an expanded virtual zone from the plurality of expanded virtual zones to be cleaned subsequently.

In some embodiments, the data processing device may execute instructions to control the cleaning robot to move in a moving path that forms a closed space (i.e., a virtual zone). The data processing device may control the cleaning robot to: 1) move in a first moving direction for a first predetermined distance from a starting location. The starting location may be a current location of the cleaning robot prior to moving in the first moving direction. The data processing device may control the cleaning robot to: 2) turn in a first predetermined turning direction to a second moving direction. In some embodiments, the first predetermined turning direction may be left turn for 90°, and the second moving direction may be perpendicular to the first moving direction. Here for discussion purposes, the left turn is used as an example. The turning direction may be a right turn. In some embodiments, the first predetermined turning direction may be left turn for an angle smaller than or greater than 90°, and the second moving direction may not be perpendicular to the first moving direction. In some embodiments, the data processing device may control the cleaning robot to: 3) move in the second moving direction for a second predetermined distance. The second predetermined distance may be the same as or different from the first predetermined distance. The data processing device may control the cleaning robot to: 4) turn in a second predetermined turning direction to a third moving direction. The second predetermined turning direction may be the same as or different from the first predetermined turning direction. In some embodiments, the second predetermined turning direction may be left turn for 90°, or for an angle different from 90° (e.g., greater than or smaller than 90°). In some embodiments, the second predetermined turning direction and the first predetermined direction may both be left turn for 90°, and the third moving direction may be parallel with and opposite to the first moving direction. In some embodiments, the data processing device may control the cleaning robot to: 5) move in the third moving direction for a third predetermined distance. In some embodiments, the third predetermined distance may be different from or the same as the first predetermined distance. The data processing device may control the cleaning robot to: 6) turn in a third predetermined turning direction to a fourth moving direction. The third predetermined turning direction may be the same as or different from the second predetermined turning direction or the first predetermined turning direction. For example, in some embodiments, the third predetermined turning direction, the second predetermined turning direction, and the first predetermined turning direction may all be left turn for 90°. In some embodiments, the third predetermined turning direction may be left turn for an angle smaller than or greater than 90°. The fourth moving direction may or may not be parallel with the second moving direction. The data processing device may control the cleaning robot to: 7) move in the fourth moving direction for a fourth predetermined distance to return to the starting location. The fourth predetermined distance may or may not be the same as the second predetermined distance.

In the present disclosure, by including a camera having an acute elevation angle mounted in an upwardly inclined manner at a front end of the cleaning robot, difficulty in localization and mapping caused by limited information provided by images of fewer features at the ceiling can be avoided. In the meantime, in a single image, features at the ceiling captured in the image may be used as stationary references for objects located in front of the cleaning robot in the forward moving direction that are captured in the same image, thereby improving the accuracy of localization and mapping for the cleaning robot. As a result, the path planning and/or navigation effects can be improved, and the low efficiency associated with the typical random cleaning mode in a conventional cleaning robot can be avoided. In the meantime, the effects of object recognition and object avoidance can be enhanced. The cleaning robot of the present disclosure can achieve a high cleaning efficiency at a low cost. In addition, the disclosed cleaning robot can realize functions in addition to the cleaning function, such as object recognition, facial recognition, real time surveillance, security surveillance, etc., thereby expanding the applications of the cleaning robot.

FIG. 1A illustrates a schematic diagram of a cleaning robot 100, according to an embodiment of the present disclosure. As shown in FIG. 1A, the cleaning robot 100 may include at least one of: one or more motion devices 105, one or more motion sensors 110, a camera 115 (e.g., a monocular camera 115), a storage device 120, a data processing device 125, one or more cleaning devices 130, a power source 135, or an exterior housing 140.

The one or more motion devices 105 may be configured to move on a floor, thereby causing the cleaning robot 100 to move on the floor. In some embodiments, the one or more motion devices 105 may include one or more wheels or tracks. The one or more motion devices 105 may be in other suitable forms that can carry the cleaning robot 100 to move, such as maglev or propeller. The present disclosure does not limit the form of the motion devices 105.

Figure 2:
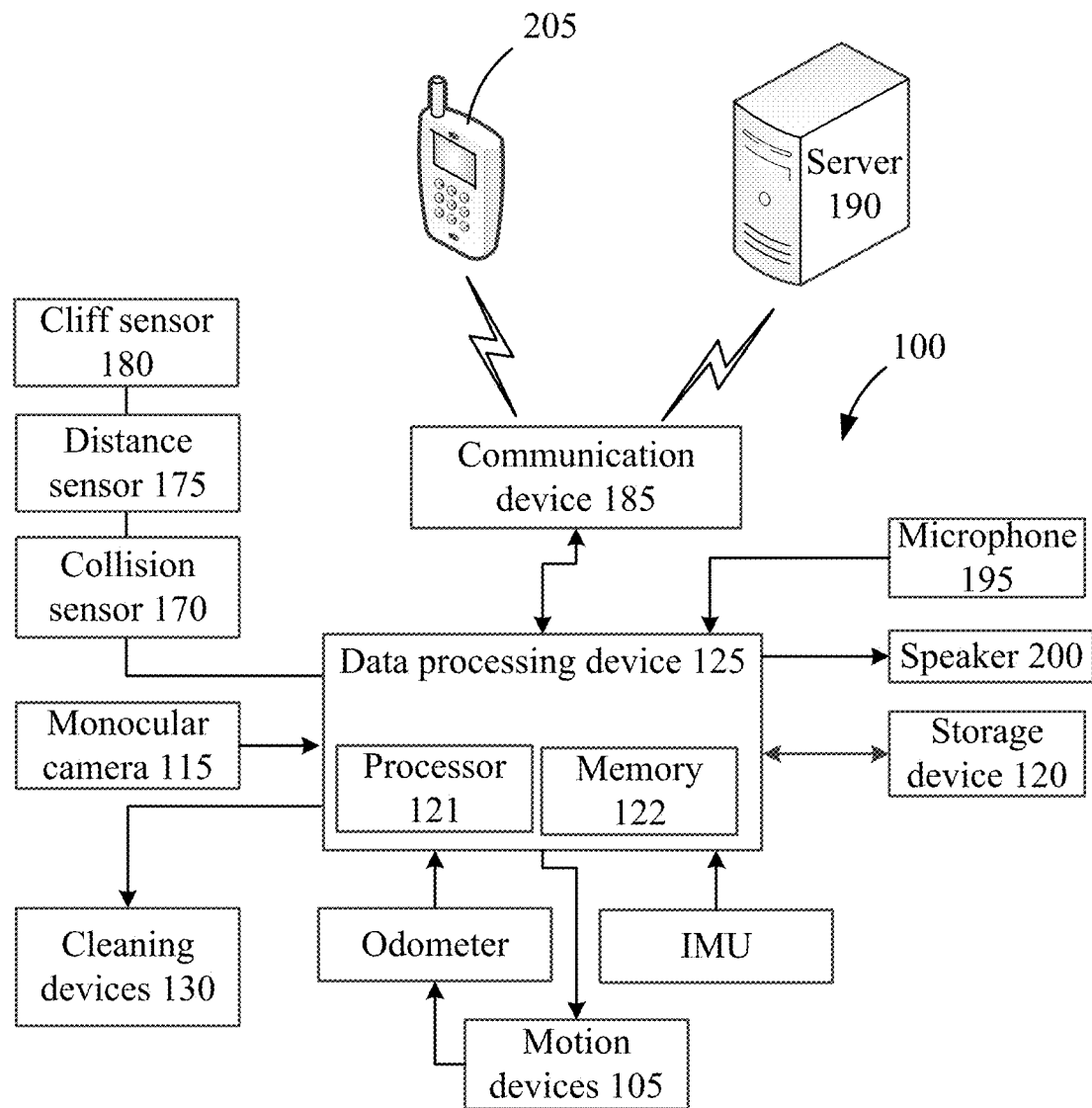
FIG. 2 illustrates a schematic diagram showing an internal configuration of the cleaning robot and connections with external devices, according to an embodiment of the present disclosure.

The one or more motion sensors 110 may be configured to obtain one or more motion parameters while the cleaning robot 100 moves. The one or more motion sensors 110 may include one or more sensors that can obtain motion parameters, such as an odometer, an inertial measurement unit ("IMU") that may include a gyroscope and/or an accelerometer. The one or more motion sensors 110 may include various displacement sensors, e.g., a resistive displacement sensor, an inductive displacement sensor, a capacitive displacement sensor, a strain-based displacement sensor, or a Hall effect displacement sensor, etc. Depending on respective characteristics, various motion sensors 110 can measure, or compute based on measurement signals, one or more motion parameters such as a distance, a displacement, an angle, a velocity, and/or an acceleration. In one embodiment of the present disclosure, the one or more motion sensors 110 may include at least one odometer (which may include two wheel encoders) and one IMU. The motion parameters obtained by the odometer and the IMU can complement each other, or can be used to correct each other. Thus the accuracy of the measured motion parameters can be improved. The odometer may be disposed at the motion devices 105 or may be connected with the motion devices 105, as shown in FIG. 2. The IMU may be configured to obtain the motion parameters when moving together with the cleaning robot 100. The IMU may be disposed at the exterior housing 140 of the cleaning robot 100 or at any other parts of the cleaning robot 100, as shown in FIG. 2, and may or may not be connected with the motion devices 105.

The camera 115 may be any suitable camera. A monocular camera is used as an example of the camera 115 in below descriptions. The monocular camera 115 may be configured to capture images of an environment in which the cleaning robot 100 operates. The monocular camera 115 may include a single camera or multiple cameras. The term "monocular camera" is relative to a binocular camera or multiocular camera. Compared to binocular cameras or multiocular cameras, monocular cameras have simpler structures and lower costs. However, a distance from the cleaning robot 100 to an object may not be determined solely based on an image captured by a monocular camera. According to embodiments of the present disclosure, multiple images of a same object may be acquired by the monocular camera 115 from multiple perspectives during a movement process. The multiple images may be used in combination with the motion parameters obtained during the movement to determine the distance. In the present disclosure, the monocular camera 115 may be disposed at a front end 155 of the exterior housing 140, internal to (e.g., behind and under) a transparent slant surface 145 that inclines upwardly relative to a forward moving direction 150.

Figure 1B:
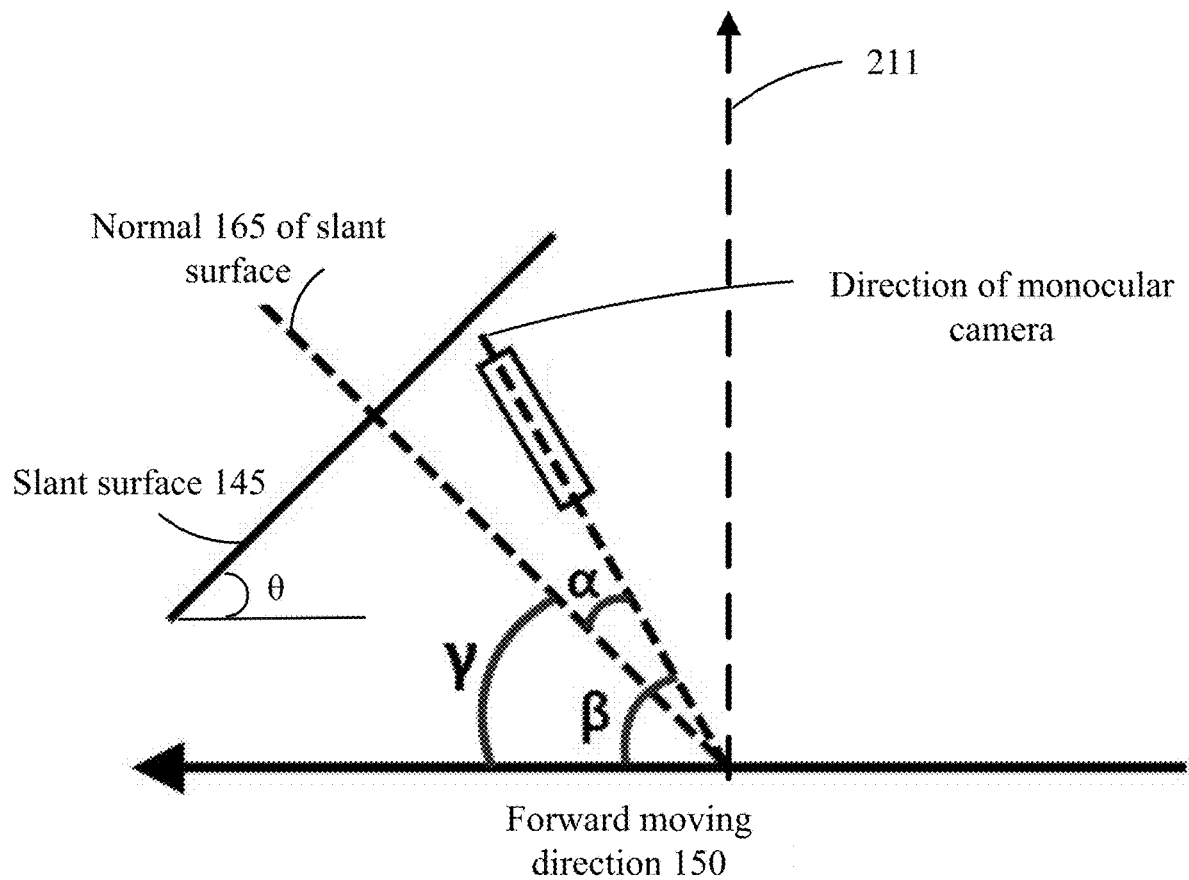
FIG. 1B illustrates a schematic diagram showing a positional relationship between a camera and a slant surface, according to an embodiment of the present disclosure.
Figure 1C:
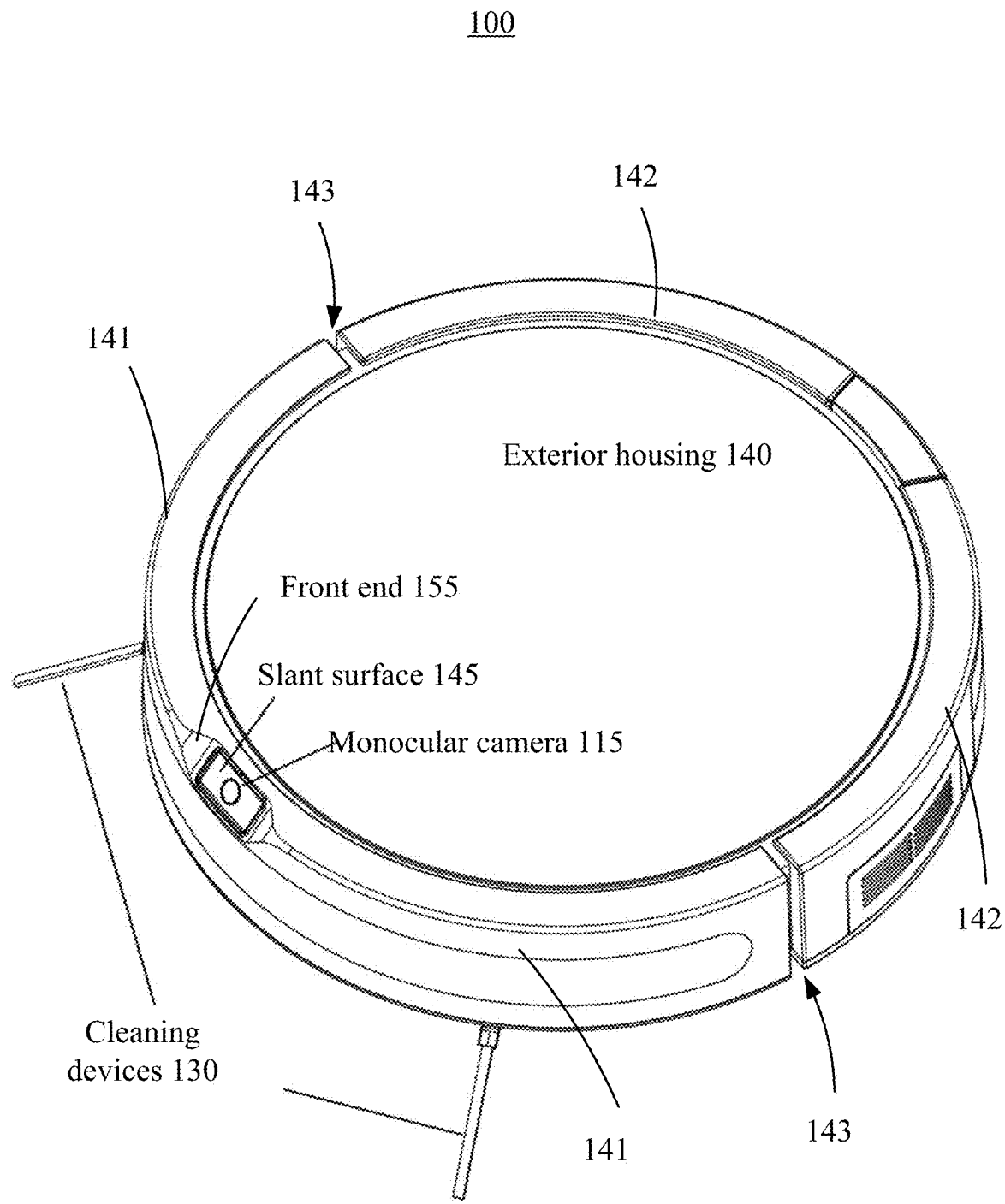
FIG. 1C illustrates a perspective view of an external design of the cleaning robot, according to an embodiment of the present disclosure.
Figure 1D:
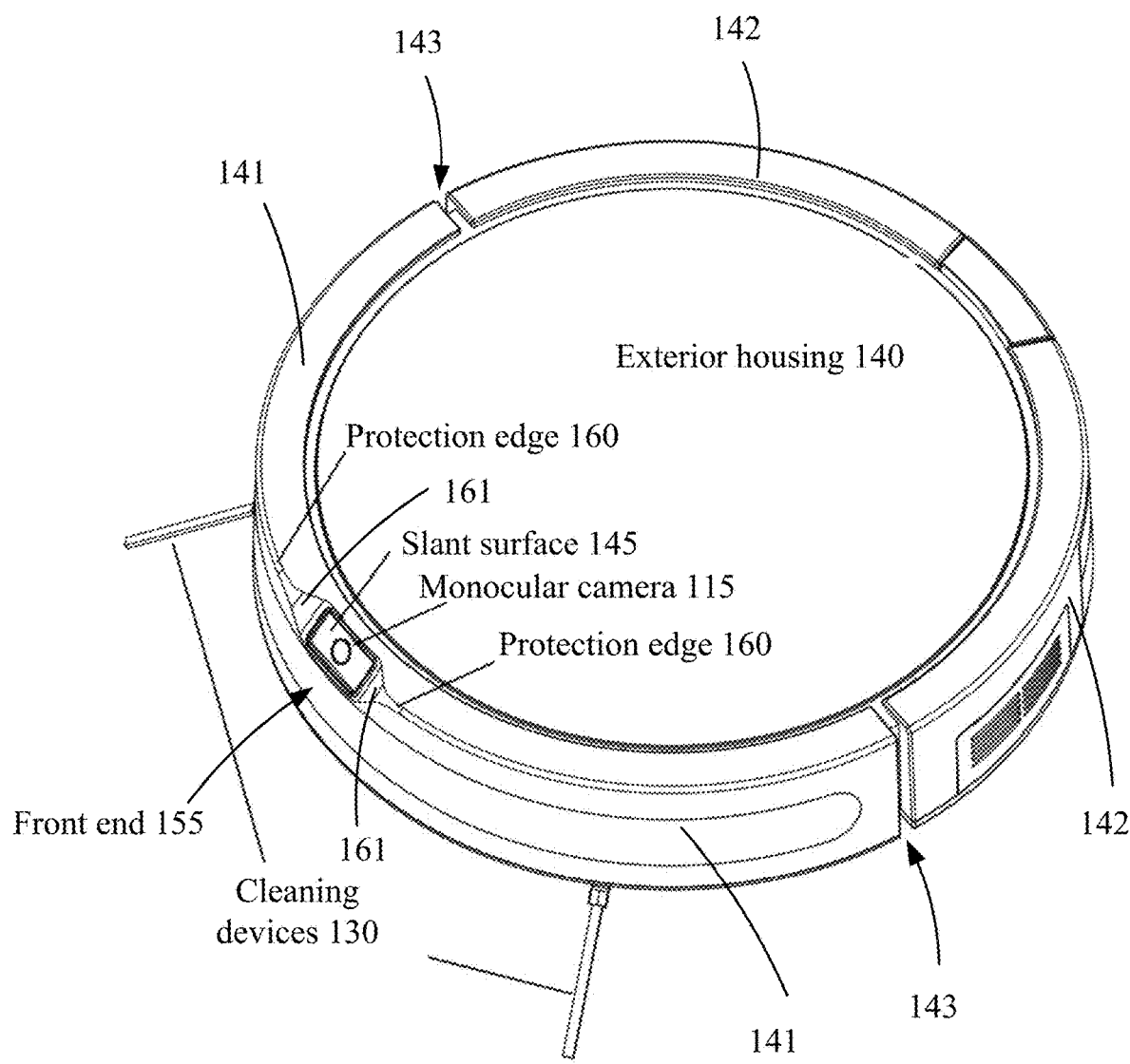
FIG. 1D illustrates a perspective view of an external design of the cleaning robot, according to an embodiment of the present disclosure.

When the monocular camera 115 is within a plane formed by a normal 165 of the slant surface 145 and the forward moving direction 150, the positional relationship between a direction of the monocular camera 115 (an optical axis direction of a lens of the monocular camera 115), the slant surface 145, and the forward moving direction 150 is shown in FIG. 1B. The slant surface 145 may be disposed at the front end 155 of the exterior housing 140 in an inclined manner relative to the forward moving direction 150 (forming an angle θ with respect to a horizontal line parallel with the forward moving direction), as shown in FIG. 1B (the inclined manner is also shown in FIGS. 1A, 1C, and 1D). That is, the slant surface 145 may face a direction between the forward moving direction 150 and the vertical upward direction. In the present disclosure, the forward moving direction 150 refers to the moving direction of the cleaning robot 100. The front end 155 refers to an end of the cleaning robot 100 that faces the forward moving direction 150. The slant surface 145 inclining upwardly relative to the forward moving direction 150 means that a direction of the normal 165 of the slant surface 145 forms an acute angle with respect to the forward moving direction 150 (the angle γ shown in FIG. 1B, where $0°<γ<90°$). The direction of the monocular camera 115 may be substantially parallel with the direction in which the slant surface 145 faces. That is, an angle α shown in FIG. 1B formed by the optical axis direction of the lens of the monocular camera 115 (i.e., the direction of the monocular camera) and the normal 165 of the slant surface 145 is an acute angle that is smaller than or equal to 45°. That is, the range of the angle α may be: $0°≤α≤45°$. In some embodiments, the optical axis direction of the monocular camera 115 may coincide with the normal 165 of the slant surface 145, i.e., $α≈0°$. The direction of the monocular camera 115 and the forward moving direction 150 of the cleaning robot 100 may form an acute angle β shown in FIG. 1B. The angle β may also be referred to as an elevation angle of the monocular camera 115. The range of the angle β may be: $0°<β<90°$. The above descriptions indicate that the monocular camera 115 may be disposed inside the exterior housing 140 at the front end 155 of the cleaning robot 100 and may face a direction between the forward moving direction 150 and the vertical upward direction. That is, the monocular camera 115 may be disposed to face forward while inclining upwardly, as shown in FIGS. 1B and 1C. In addition, the transparent slant surface 145 may be disposed in front of and over the lens of the monocular camera 115 to protect the monocular camera 115. The normal 165 of the transparent slant surface 145 may point in a direction that is substantially parallel with the optical axis direction of the lens of the monocular camera 115. This configuration enables lights to transmit through the transparent slant surface 145, such that the monocular camera 115 can capture images including information of objects at a ceiling located above the cleaning robot 100 in the forward moving direction 150 and information of objects located in front of the cleaning robot 100 in the forward moving direction 150 (e.g., the objects located on the floor).

In some embodiments, the monocular camera 115 may be mounted on a rotatable frame or base, such that the monocular camera 115 may be rotatable or pivotable in a vertical plane formed by the normal 165 of the slant surface 145 and the forward moving direction 150. The rotatable frame or base may be manually rotatable or may be automatically driven by a motor. The rotatable frame or base may be rotatable in any suitable direction, such that the monocular camera 115 may be rotatable in any suitable direction. In some embodiments, the angle α between the direction of the monocular camera 115 and the normal 165 of the slant surface (and the angle β between the direction of the monocular camera 115 and the forward moving direction 150) may be adjusted (e.g., manually or automatically) during the movement of the cleaning robot 100 or while the cleaning robot 100 is not in movement. In some embodiments, the monocular camera 115 may be rotatable or pivotable in a horizontal plane, i.e., around a vertical axis 211 of the cleaning robot 100, as shown in FIG. 1B. Thus, in some embodiments, the monocular camera 115 may be pivotable relative to the slant surface 145 in both the vertical plane and the horizontal plane.

Referring to FIG. 1B, in some embodiments, the slant surface 145 may be fixed (non-rotatable or pivotable) relative to the front end 155 of the exterior housing 140. That is, an angle θ formed by the slant surface and a horizontal direction may be fixed. For example, the slant surface 145 may be an integral part of the front end 155 of the exterior housing 140, or may be a separate part that is fixedly attached or mounted to the front end 155. In some embodiments, the slant surface 145 may be rotatably (or pivotably) mounted to the front end 155. That is, the angle θ may be manually (e.g., by a user) or automatically (e.g., driven by a motor) adjustable.

One type of a floor cleaning robot according to conventional technologies includes a camera disposed at a top portion of the floor cleaning robot, facing upwardly. An issue associated with this type of floor cleaning robot is that the camera disposed to face upward vertically can only capture images of the objects at the indoor ceiling. However, because patterns or features of the indoor ceiling are often simple with few feature points (e.g., a pure white ceiling or a ceiling with simple grid patterns), the number of features at the ceiling captured by the camera is small, and may not provide sufficient information for accurate localization and mapping. On the other hand, another type of floor cleaning robot according to the conventional technologies includes a camera disposed at the front end to face straight ahead in the forward moving direction. Such a configuration enables the camera to capture images of the objects located in front of the floor cleaning robot straight in the forward moving direction (e.g., in a direction parallel to the floor surface) for localization and mapping. However, this type of floor cleaning robot also has issues. For example, moving objects (e.g., pets or humans) often appear in front of the floor cleaning robot. The moving objects may interfere with the localization and mapping of the floor cleaning robot, causing errors in the localization of the floor cleaning robot and in the mapping of the environment. For example, when a triangulation method is implemented for localization and mapping, the camera needs to capture multiple images of a same object from different location points during a movement of the floor cleaning robot. If these images are used to determine the location of the camera, the objects that are imaged need to be at the same location at different time instances when the images are captured. Otherwise, localization errors may occur. The configuration of the monocular camera 115 in the present disclosure can resolve the issues associated with the upward facing configuration and the forward facing configuration in the conventional floor cleaning robots.

According to the present disclosure, the monocular camera 115 may be disposed at the front end 155 of the exterior housing 140 and internal to (e.g., behind and under) the transparent slant surface 145 that inclines upwardly relative to the forward moving direction 150. The monocular camera 115 and the slant surface 145 may face substantially the same direction. The direction of the monocular camera 115 and the forward moving direction 150 of the cleaning robot 100 may form an acute angle β. In other words, the monocular camera 115 may face a direction that is between the vertical upward direction and the forward moving direction 150. As a result of this configuration, the monocular camera 115 may simultaneously obtain information of objects at the ceiling located above the cleaning robot 100 in the forward moving direction 150 and information of objects in front of the cleaning robot 100 in the forward moving direction 150. On one hand, the features of the objects located in front of the cleaning robot 100 are rich, which are useful for localization and mapping. On the other hand, stationary objects at the ceiling may be used as references (most of the objects at the ceiling are stationary, and hence, can serve as references even though the number of features may be small) for determining whether an object located in front of the cleaning robot 100 is moving or has moved, thereby avoiding interference to the mapping, localization, and navigation of the cleaning robot 100 caused by moving objects appearing in front of the cleaning robot 100 in the forward moving direction 150. The cleaning robot 100 of the present disclosure can avoid issues in localization and mapping caused by limited feature information of the objects at the ceiling. In the same image captured by the monocular camera 115, features of stationary objects at the ceiling can be extracted and used as stationary references for the cleaning robot 100, which enable a determination of whether an object in front of the cleaning robot 100 in the forward moving direction 150 has moved or is moving.

The monocular camera 115 may be connected with the data processing device 125 through a wired or wireless connection. The monocular camera 115 may transmit the captured images (or image data) to the data processing device 125. The present disclosure does not limit the type of the monocular camera 115, which may be a standard camera, a wide angle camera, a fisheye camera, or other types of camera. The captured images of the objects may be images captured under the visible lights, or under infrared lights. The present disclosure does not limit the type of cameras and the type of captured images.

The storage device 120 may be any suitable non-transitory computer-readable medium or device for storing, transferring, communicating, broadcasting, or transmitting data, signal, or information. For example, the storage device may include a memory, a hard disk, a magnetic disk, an optical disk, a tape, etc. The memory may include a read-only memory ("ROM"), a random-access memory ("RAM"), a flash memory, etc. In some embodiments, the storage device 120 may be connected with the data processing device 125 through a wired or wireless connection. The storage device 120 may be configured for storing data. The stored data may include, but not be limited to, various types of sensor data. The sensor data may include motion parameters obtained by the one or more motion sensors 110 during a movement of the motion devices 105, such as a distance, a displacement, an angle, a velocity, an acceleration, etc. The sensor data may also include images (or image data) captured by the monocular camera 115. The sensor data may further include data acquired, computed, or generated by other sensors, such as a collision sensor 170, a distance sensor 175, a cliff sensor 180, etc. In some embodiments, the distance sensor 175 may be an infrared distance sensor, a Lidar sensor, an ultrasonic sensor, or a time-of-flight ("TOF") sensor, etc. The cliff sensor 180 may be configured to determine whether the cleaning robot 100 is located at an edge of a higher ground with a risk of falling to a lower ground (e.g., at an edge of stairs leading to a lower floor). It is understood that not all sensors included in the cleaning robot 100 are shown in FIG. 2, and that in some embodiments, the cleaning robot 100 may not include one or more sensors shown in FIG. 2. The stored data may also include intermediate data generated during the computing processes performed by the data processing device 125, newly built or transferred map data, etc. The present disclosure does not limit the data type, purpose, or sources of the data stored therein.

The data processing device 125 may include a processor 121 and a memory 122. The processor 121 may be any suitable processor that is configured with a data processing or computing capability. The processor 121 may be a central processing unit ("CPU"), a graphics processing unit ("GPU"), a microcontroller ("MCU"), a digital signal processor ("DSP"), a field programmable gate array ("FPGA"), an application-specific integrated circuit ("ASIC"), a programmable logic device ("PLD"), or any combination thereof. Other processors not listed above may also be used. The processor 121 may include software, hardware, firmware, or any combination thereof. For example, the processor 121 may include a hardware circuit, logic gates, switches, etc. The processor 121 may execute computer-executable instructions to perform various functions, such as controlling the cleaning robot 100 to move on a floor and to clean the floor. The processor 121 may perform other functions related to the cleaning robot 100. In some embodiments, the processor 121 may execute instructions representing a localization and mapping algorithm while controlling the movement and/or the operations (e.g., cleaning operations) of the cleaning robot 100. The various functions described below as being performed by the data processing device 125 may be at least partially performed by the processor 121.

The memory 122 may be an example of a non-transitory computer-readable medium. The memory may be a read-only memory ("ROM"), a random-access memory ("RAM"), a flash memory, an Electrically Programmable read only memory ("EPROM"), or an Electrically Erasable Programmable read only memory ("EEPROM"). The memory 122 may be configured to store data, such as instructions or codes executable by the processor 121, and/or image data, sensor data retrievable by the processor 121. For example, the instructions or codes stored in the memory 122 may represent a localization and mapping algorithm. In some embodiments, the instructions or codes stored in the memory 122 may be configured for controlling the movement and/or operations (e.g., the cleaning operations, object finding operations, obstacle avoidance operations, etc.) of the cleaning robot 100.

The data processing device 125 may include other types of hardware chips, processors, or software algorithms having data processing and computing capabilities. The present disclosure does not limit the type and form of the data processing device 125. The data processing device 125 described herein is a generic term, which may be a single integral processor of the cleaning robot 100, or may be a set of multiple processors or processing devices. For example, the data processing device 125 may include a first processing unit of a remote computer and a second processing unit of a chassis. In such situations, the combination of the first processing unit and the second processing unit can perform various functions of the data processing device 125. The present disclosure does not limit the number of data processing units, the connection methods and the allocation of functions and computing capabilities between the multiple processing units.

The data processing device 125 may be configured to obtain images captured by the monocular camera 115, and/or motion parameters obtained by the one or more motion sensors 110. The data processing device 125 may be configured to perform localization, mapping, and path planning for the cleaning robot 100 based on a location and mapping algorithm. For example, the data processing device 125 may execute the location and mapping algorithm, which may be embodied in computer-executable instructions or codes (or programs). In other words, the data processing device 125 may execute the location and mapping algorithm based on the images acquired by the monocular camera 115 and/or sensor data obtained by various sensors to control the movement and/or the cleaning operations and other operations of the cleaning robot 100. The data processing device 125 may be configured to control the motion devices 105 to move along the planned path. In addition, the data processing device 125 may be configured to perform map optimization, map correction, and loop detection, etc. During the processes of executing one or more of the above functions, the data processing device 125 may retrieve relevant data, information, and program (e.g., instructions) from the storage device 120. In some embodiments, the data processing device 125 may store data, information, and intermediate data or documents in the storage device 120. The present disclosure does not limit the operations of retrieving/storing various data/information by the data processing device 125 and the storage device 120.

A chassis (not shown in figures) of a cleaning robot 100 may include the one or more motion devices 105 (e.g., wheels), the one or more motion sensors 110 (e.g., an odometer, which may include two wheel encoders), a data processing unit (e.g., a processor such as an MCU, a DSP, etc.). The chassis, as a part of the cleaning robot 100, can be divided into a plurality of functional units based on functions.

The one or more cleaning devices 130 may be configured to clean the floor. The one or more cleaning devices 130 may include a brush and/or a mop. In some embodiments, the cleaning robot 100 may be a floor cleaning robot, and the one or more cleaning devices 130 may include a main brush and a side brush. Exemplary side brushes are shown in FIG. 1C as parts of the cleaning devices (the main brush is not shown).

The power source 135 may be configured to provide an electric power to the cleaning robot 100. In some embodiments, a battery may be used as the power source 135 to provide an electric power to the cleaning robot 100. A docking station may be configured external to the cleaning robot 100 for recharging the battery. In some embodiments, the cleaning robot 100 may be automatically recharged. When the power is below a predetermined threshold, the cleaning robot 100 may automatically return to the docking station to be recharged. For example, the data processing device 125 may monitor/detect the level of the electric power. When the data processing device 125 determines that the electric power is lower than the predetermined threshold, the data processing device 125 may control the cleaning robot 100 to move to the docking station to be charged.

The exterior housing 140 may be configured to accommodate the above-described various assemblies and functional units of the cleaning robot 100, as shown in FIG. 1A. In some embodiments, the exterior housing 140 may not accommodate, or may not fully accommodate, the one or more motion devices 105, the one or more cleaning devices 130, and/or the one or more motion sensors 110. In other words, the one or more motion devices 105, the one or more cleaning devices 130, and/or the one or more motion sensors 110 may be at least partially exposed from the exterior housing 140. The exterior housing 140 may have any suitable shape, such as the round shape shown in FIG. 1C, a "D" shape, a square shape, a rectangle shape, an oval shape, etc.

According to an embodiment of the cleaning robot 100 of the present disclosure shown in FIG. 1D, the exterior housing 140 may include protection edges 160 configured to protect the slant surface 145 (and hence the monocular camera 115). For example, the protection edges 160 may be disposed at the front end 155 of the exterior housing 140. The protection edges 160 protruding forwardly and higher than the slant surface 145 may be disposed at the front end 155 at the left and right sides of the slant surface 145 to protect the slant surface 145, thereby protecting the monocular camera 115 disposed internal to (e.g., behind and under) the slant surface 145. A cut-away slopes 161 may connect the protection edges 160 and a portion of the exterior housing 140 where the slant surface 145 is disposed in an inclined manner. As compared to straight walls in conventional technologies, the cut-away slopes 161 of the present disclosure allow the monocular camera 115 to capture images in a wider viewing angle. A cleaning robot installed with a collision sensor typically detects the existence and location of an obstacle by collision. Collision can increase the risk of damaging the monocular camera 115. In the disclosed design, the protection edges 160 are located higher and further forward than the slant surface 145. Thus, when collision occurs, the protection edges 160 collide with the obstacle before the slant surface 145 collides with the obstacle (if it occurs), thereby protecting the slant surface 145, and further protecting the monocular camera 115 disposed under and behind the slant surface 145 from damage due to the collision with the obstacle.

According to an embodiment of the cleaning robot 100 of the present disclosure, the monocular camera 115 may be automatically or manually rotated (or pivoted) within a vertical plane formed by the normal 165 of the slant surface 145 and the forward moving direction 150. That is, the elevation angle of the monocular camera 115 (i.e., the angle $\beta$ in FIG. 1B) may be automatically or manually adjustable. Depending on the actual environment and/or the tasks performed by the cleaning robot 110, the elevation angle $\beta$ of the monocular camera 115 may be manually adjusted by a user or automatically adjusted by the cleaning robot 110. If the data processing device 125 determines, e.g., based on images captures by the monocular camera 115, that the objects in the forward moving direction 150 are all stationary objects, the elevation angle $\beta$ may be reduced such that during the operations of the cleaning robot 100, more information relating to the objects located in front of the cleaning robot 100 can be obtained. If the cleaning robot 100 is deployed in an environment with a relatively large number of people, such as in a hospital, a conference room, or a family gathering, because there are many moving objects, the elevation angle $\beta$ may be increased such that during operations of the cleaning robot 100, more information relating to the objects at the ceiling can be obtained. If the cleaning robot 100 is configured to avoid the obstacle or find objects, the elevation angle $\beta$ may be reduced such that during operations of the cleaning robot 100, more information relating to the objects on the floor in front of the cleaning robot 100 can be obtained for the purposes of avoiding the obstacle or finding the objects. In some embodiments, the cleaning robot 100 may be configured with a security guard function. If the cleaning robot 100 is configured to detect whether a window is broken or open, the elevation angle $\beta$ may be adjusted to an angle suitable for capturing more features or a specific feature of the window. The range in which the elevation angle $\beta$ may be adjusted is within a range of light transmission of the slant surface 145, such that a sufficiently large light transmissivity can be provided to the monocular camera 115. In some embodiments, the change of the elevation angle $\beta$ may be within a range such that the angle $\alpha$ shown in FIG. 1B between the direction of the monocular camera 115 and the direction of the normal 165 of the slant surface 145 is maintained to be less than 45°.

In some embodiments of the present disclosure, during the operations of the cleaning robot 100, the monocular camera 115 may be configured to move up and down (or referred to as vertical scan, or "scan" in short) in a predetermined frequency within the plane formed by the normal 165 of the slant surface 145 and the forward moving direction 150, such that the elevation angle $\beta$ may be adjusted in a range, thereby increasing the range of image capturing. The frequency may be suitably configured according to a moving speed of the cleaning robot 100, such that multiple vertical scans can be performed to capture images of at least portions of the same features of the same object, which may be used in a subsequent localization process. Correspondingly, during image processing, based on the scan frequency and the moving speed of the cleaning robot 100, the same features of the same object may be extracted from the multiple scanned images, and localization of the cleaning robot 100 may be performed based on the extracted same features.

In some embodiments, the monocular camera 115 of the cleaning robot 100 may reciprocatively rotate in a horizontal plane at a predetermined frequency during the operations of the cleaning robot 100 (or referred to as a horizontal scan; the horizontal plane may be parallel with a moving plane of the cleaning robot 100 or may be parallel with the floor). More information of objects located in the horizontal plane may be obtained from images captured during the horizontal scan.

According to an embodiment of the present disclosure, the cleaning robot 100 may also include a communication device 185 (e.g., a WiFi device, a Bluetooth device, a cellular communication device, etc.). The communication device 185 may be wirelessly connected with a server 190, as shown in FIG. 2. In some embodiments, the server 190 may be a remote computer, such as a cloud server. In some embodiments, the communication device 185 may be connected with the server 190 through a wired connection. For example, when the cleaning robot 100 is not in operation to clean the floor, the communication device 185 may be connected with the server 190 through an Ethernet connection. Although FIG. 2 shows components such as various sensors, a microphone 195, a speaker 200, the server 190, a user terminal device 205, the communication device 185, it does not mean that all of the components shown in FIG. 2 are necessarily included in a same embodiment. These components may be selectively included in some embodiments, or flexibly combined in suitable manners in some embodiments. Furthermore, the cleaning robot 100 may include additional sensors or components not shown in FIG. 2.

In some embodiments, the data processing device 125 may transmit information (e.g., data or commands) to the server 190 through the communication device 185. In some embodiments, the data processing device 125 may obtain information (e.g., data or commands) from the server 190 through the communication device 185. For example, the data processing device 125 may transmit captured images, sensor data, localization data, etc., to the server 190 for further computation. In some embodiments, the data processing device 125 may receive, from the server 190 through the communication device 185, data of a map and/or a planned path generated by the server 190. Alternatively or additionally, the data processing device 125 of the cleaning robot 100 may perform computations for the localization and mapping, and/or computations for the path planning. The server 190 may store setting information, historical information, and/or map data. The present disclosure does not limit the allocation of the data storage and functions between the server 190, the storage device 120 of the cleaning robot 100, and the data processing device 125 of the cleaning robot 100.

According to an embodiment of the present disclosure, the communication device 185 of the cleaning robot 100 may be wireless connected with the user terminal device 205 (e.g., a cell phone, a computer, a pad, etc., as shown in FIG. 2. In some embodiments, the communication device 185 may be connected with the user terminal device 205 through a wired connection, such as a Universal Serial Bus ("USB") connection. The data processing device 125 may receive information (e.g., data or commands) from the user terminal device 205 through the communication device 185. Additionally or alternatively, the data processing device 125 may transmit information (e.g., audio, image, and/or text information) to the user terminal device 205 through the communication device 185. The commands received from the user terminal device 205 may include query commands and/or control commands, such as, commands for turning on/off the cleaning robot 100, selecting a cleaning mode, commands for playing music, commands for recharging the battery, commands for cleaning a specific room, commands for dumping the trash, commands for capturing an image of a specific location (e.g., a window), etc. The present disclosure does not limit the commands received by the cleaning robot 100 from the user terminal device 205 or the information transmitted by the cleaning robot 100 to the user terminal device 205. In some embodiments, the cleaning robot 100 may include the user terminal device 205 and may not include the server 190 described above, or may also include the server 190. When the cleaning robot 100 includes the user terminal device 205 and the server 190, the communication device 185 may be configured to separately or independently transmit data or information to the user terminal device 205 and the server 190, and separately or independently receive data or information from the user terminal device 205 and the server 190. In some embodiments, the communication device 185, the user terminal device 205, and the server 190 may function as a single entity to transmit, compute, analyze, and/or integrate the data or information.

According to an embodiment of the present disclosure, the cleaning robot 100 may also include the microphone 195 and/or the speaker 200, as shown in FIG. 2. The microphone 195 may acquire voice control commands, and may transmit the voice control commands to the data processing device 125. In some embodiments, the data processing device 125 may decode the received voice control commands and perform a matching process to match the decoded voice control commands with predetermined voice control commands stored in the memory 122 or the storage device 120. The data processing device 125 may execute relevant control commands based on a result of the matching. In some embodiments, to save local computing capability for the cleaning robot 100, after the data processing device 125 decodes the received control commands, the data processing device 125 may transmit the decoded control commands through the communication device 185 and a wireless network to the server 190 and/or the user terminal device 205 to perform the matching process. The server 190 and/or the user terminal device 205 may transmit a result of the matching to the cleaning robot 100 to execute relevant control commands. The voice control commands may include various commands, such as query commands, commands for turning on/off the cleaning robot 100, commands for selecting a cleaning mode, commands for playing music, commands for recharging the battery, commands for cleaning a specific room, commands for dumping the trash, commands for capturing an image of a specific location (e.g., a window), etc. The speaker 200 may transmit acoustic information to an external environment, such as a sound relating to clock or timer information, calendar reminder, plan reminder, alarm notification, cleaning robot malfunction notification, cleaning robot information notification (e.g., notifications such as "already finished cleaning a designated zone," "recharging notification," etc.). In some embodiments, the speaker may output sound for music played by the cleaning robot 100, or sound from a radio program played by the cleaning robot 100. Through the microphone 105 and/or the speaker 200, various human-machine interaction functions may be realized between a user and the cleaning robot 100, such as controlling home appliances, playing music, answering questions, assisting in translation, voice-based shopping, etc.

According to an embodiment of the present disclosure, in the cleaning robot 100, the slant surface 145 may be covered by, include, or be made of a light transmitting material, such as glass or highly transmissive plastic, such that the monocular camera 115 can capture a clear and bright image of the external environment through the light transmissive material. In the meantime, the light transmissive material may function to block dust and avoid impact for the monocular camera 115. In some embodiments, the light transmissive plastic material may include GPPS, transparent ABS, AS, PMMA, PC, and/or PS. In some embodiments, a PMMA acrylic material may be used. The PMMA acrylic material may have a light transmittance of 92%-95%, which is higher than a transmittance of an ordinary glass (about 80%). In some embodiments, the light transmissive material may be a light transmissive film having a relatively high strength, such as polyvinyl chloride film, polyethylene film, etc. In some embodiments, the slant surface 145 may include an impact resistant material. The present disclosure does not limit the type of the light transmissive material.

In an embodiment of the cleaning robot 100, the direction of the monocular camera 115 and the direction of the normal 165 of the slant surface 145 may coincide or be in parallel with one another, thereby achieving a maximum light transmittance to enable the monocular camera 115 to capture clear images.

In an embodiment of the cleaning robot 100, the elevation angle $\beta$ of the monocular camera 115 between the direction of the monocular camera 115 and the forward moving direction 150 of the cleaning robot 100 may be in a range of $30° \leq \beta < 90°$. With the elevation angle $\beta$ and the about 90° vertical field of view, the monocular camera 115 may obtain information of most objects located in front of the cleaning robot 100 in the forward moving direction 150, information of most objects at the ceiling, and information of a portion of the floor. Such information obtained through the monocular camera 115 can satisfy most of the functions and purposes. In some embodiments, when the vertical field of view is 90° and the elevation angle β is 30°, it can be computed that the shortest distance in which the monocular camera 115 can capture images of the floor is about 30 cm. In some embodiments, when the elevation angle is 40°, the shortest distance in which the monocular camera 115 can capture images of the floor is about 90 cm. To obtain more floor information, and to reduce the blind zone, a smaller elevation angle β may be used. When a smaller elevation angle β is used, there may be a partial loss in the ceiling information. To obtain more ceiling information, a larger elevation angle β may be used. Thus, the elevation angle β may be adjusted based on application needs.

In an embodiment of the cleaning robot 100, the vertical field of view of the monocular camera 115 may be in a range of about 50° to about 100° (e.g., when a wide angle lens is used in the monocular camera 115). Using a wide angle lens can reduce distortion in images while obtaining as much information as possible, thereby reducing a distortion factor of the images. When a fisheye lens having a larger vertical field of view is used (which may have a vertical field of view of about 180°), the distortion in the images may increase. Thus, the lens of the monocular camera 115 can be selected based on applications and functions.

In an embodiment of the cleaning robot 100, the localization and mapping algorithm executable by the data processing device 125 may include instructions for the following operations: recognizing feature information included in at least two images captured by the monocular camera 115; computing displacements and poses of the cleaning robot 100 based on one or more motion parameters relating to a motion of the cleaning robot 100 obtained by the one or more motion sensors 110 at time instances when the at least two images are captured and based on the feature information; and computing a location of the cleaning robot 100 at each time instance when each of the at least two images is captured (i.e., performing localization of the cleaning robot 100). The feature information may be extracted from at least two images captured by the monocular camera 115, which is disposed such that the optical axis of the lens of the monocular camera 115 forms an acute elevation angle β with respect to the forward moving direction 150 of the cleaning robot 100. In some embodiments, the data processing device 125 may execute an image recognition or processing algorithm to recognize and extract features of an object captured in the images. In some embodiments, the feature information may include information relating to the same feature(s) of the same object(s) captured in the images. In some embodiments, the feature information may include information relating to one or more objects located in front of the cleaning robot 100 in the forward moving direction 150 and one or more objects located at the ceiling over a portion of the floor ahead of the cleaning robot 100. In some embodiments, the feature information may include coordinates of feature points included in the images in a pixel (or image) coordinate system. In some embodiments, the computation of the displacements and poses of the cleaning robot 100 may be based on the motion parameters and based on the two-dimensional coordinates of the feature points in the pixel (image) coordinate system. In some embodiments, the computation of the displacements and poses of the cleaning robot 100 may not be based on three-dimensional coordinates of an object in the environment in a global coordinate system derived from the two-dimensional coordinates of image features corresponding to the same object in the captured images in the pixel (or image) coordinate system. During a process of cleaning the floor, the primary function of the monocular camera 115 may be capturing images for localization purposes, i.e., assisting in the determination of the location of the cleaning robot 100. When configured to capture images for other purposes, such as object finding, security guard, nanny, the monocular camera 115 may be configured with functions such as object recognition, human recognition, scene recognition, etc.

In an embodiment of the present disclosure, the cleaning robot 100 may also include the collision sensor 170, as shown in FIG. 2. The cleaning robot 100 may obtain obstacle information through the collision sensor 170, and may build a map based on the obstacle information. The collision sensor 170 may be disposed at the front end 155 of the cleaning robot 100. The collision sensor 170 may be disposed external to the exterior housing 140, internal to the exterior housing 140, or partially internal and partially external to the exterior housing 140. When the cleaning robot 100 collides with the obstacle, the collision sensor 170 may generate and transmit a collision signal to the data processing device 125. Based on the collision signal, the data processing device 125 may determine that the cleaning robot 100 has collided with an obstacle. The localization and mapping algorithm executable by the data processing device 125 may also include instructions for the following operations: based on a determination that the cleaning robot 100 collides with the obstacle, determining a location of the obstacle in the environment based on the collision signal from the collision sensor 170 and based on a location of the cleaning robot 100 in the environment at a time instance when the collision occurs; and building a map of a work zone based on the location of the obstacle. As shown in FIG. 1C, the circumferential portion of the exterior housing 140 may include two separated portions: a front exterior housing portion 141 and a back exterior housing portion 142. The two portions may be separated with a gap 143 on each side of the cleaning robot 100. The collision sensor 170 may be disposed at the front exterior housing portion 141. For example, the collision sensor 170 may be disposed behind the front exterior housing portion 141, or at least partially exposed at an outer surface of the front exterior hosing portion 141. The front exterior housing portion 141 may be flexibly coupled with the main body (or the chassis) of the cleaning robot 100 through a resilient manner, such as through a pre-loaded spring. When a collision occurs, the front exterior housing portion 141 may be pushed by the obstacle toward the back exterior housing portion 142. The gaps 143 may provide a buffering zone between the front exterior housing portion 141 and the back exterior housing portion 142. The buffering zone may help avoid or mitigate damages to the front exterior housing portion 141 when a collision occurs.

In an embodiment of the present disclosure, the cleaning robot 100 may also include the distance sensor 175, which may be an infrared distance sensor, an ultrasonic distance sensor, the position sensitive detector ("PSD"), a TOF sensor, a Lidar sensor, etc. When the distance sensor 175 detects the obstacle, the distance sensor 175 may determine a relative position of the obstacle relative to the cleaning robot 100 (which may be computed based on a relative distance and a relative angle between the obstacle and the cleaning robot 100), and may transmit the relative position of the obstacle to the data processing device 125. In some embodiments, the localization and mapping algorithm executable by the data processing device 125 may also include instructions for the following operations: determining a location of the obstacle based on the relative position of the obstacle transmitted from the distance sensor 175 and a location of the cleaning robot 100 at a time instance when the distance sensor 175 obtains the relative position of the obstacle. The location of the cleaning robot 100 may be represented by coordinates of the cleaning robot 100 in a global coordinate system in the environment at a specific time instance. The global coordinate system may be a Cartesian coordinate system. The location of the obstacle may be determined based on the location of the cleaning robot 100 in the global coordinate system and a relative position of the obstacle relative to the cleaning robot 100 in a relative coordinate system established at the cleaning robot 100. The global Cartesian coordinate system may include an origin, which may be the starting location of the cleaning robot 100, an x-axis and a y-axis may be established as any suitable perpendicular axes. The global coordinate system is fixed in the environment and does not move with the cleaning robot 100. The relative coordinate system established at the cleaning robot 100 moves with the cleaning robot 100. The relative coordinate system may be established with any suitable point on the cleaning robot 100 as the origin, the forward moving direction 150 of the cleaning robot 100 as the x-axis. The y-axis of the relative coordinate system may be obtained by rotating the x-axis around the origin and a vertical axis passing a center of gravity of the cleaning robot 100 for 90° in a counter-clockwise direction. At a specific time instance, coordinates of the cleaning robot 100 in the global Cartesian coordinate system represent the location of the cleaning robot 100 in the environment. Coordinates of the obstacle in the relative coordinate system of the cleaning robot 100 represents the relative position of the obstacle. Thus, the location of the obstacle in the global coordinate system can be computed based on the coordinates of the cleaning robot 100 in the global coordinate system and the coordinates of the obstacle in the relative coordinate system. These exemplary coordinate systems are merely example coordinate systems for representing the location of the cleaning robot 100 and/or the location of the obstacle. The present disclosure does not limit the coordinate systems used for representing the locations of the cleaning robot 100 and/or the obstacle. The localization and mapping algorithm executable by the data processing device 125 may also include instructions for the following operation: building a map of a work zone based on the location of the obstacle.

Figure 3A:
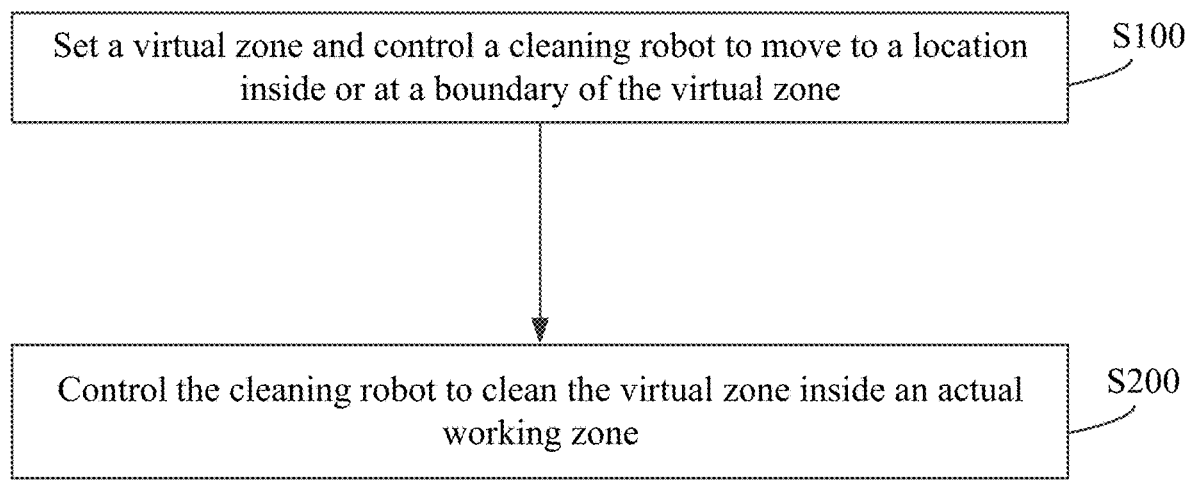
FIG. 3A illustrates a flowchart showing processes of a localization and mapping algorithm executable by the cleaning robot, according to an embodiment of the present disclosure.

In an embodiment of the cleaning robot 100 of the present disclosure, as shown in FIG. 3A, the localization and mapping algorithm executable by the data processing device 125 may also include instructions for the following operations:

Step S100, setting a virtual zone inside a work zone (also referred to as an actual work zone), and controlling the cleaning robot 100 to move to a location inside the virtual zone or at a boundary of the virtual zone. In some embodiments, setting the virtual zone may include controlling a moving distance and/or a rotating angle (or turning angle) of the cleaning robot 100 to cause a moving path of the cleaning robot 100 in the actual work zone to form a closed space that defines the virtual zone.

Step S200, controlling the cleaning robot 100 to move inside the virtual zone and clean the virtual zone located inside the actual work zone.

Figure 3B:
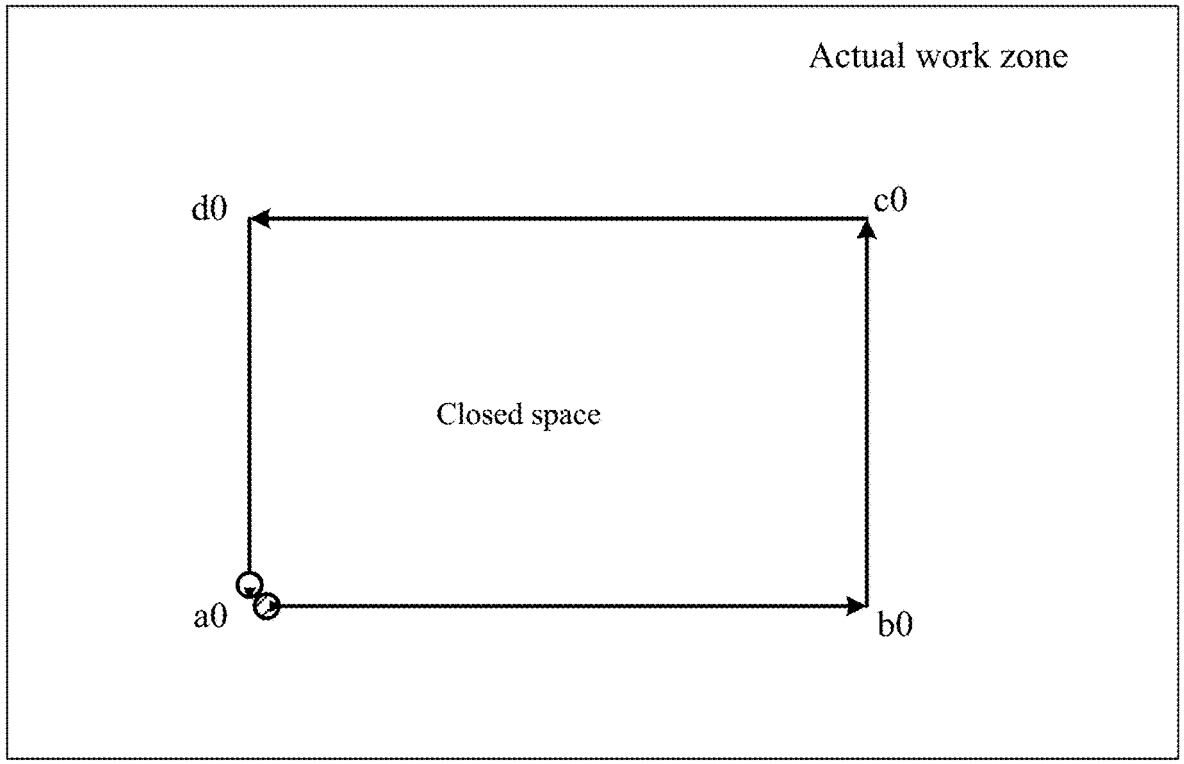
FIG. 3B illustrates a schematic diagram showing a moving path in the location and mapping algorithm executable by the cleaning robot, according to an embodiment of the present disclosure.

The step S100 for setting the virtual zone is further explained as follows with reference to FIG. 3B. A person having ordinary skills in the art can appreciate that instructions other than those shown in FIG. 3B may be executed to cause the moving path of the cleaning robot 100 in the actual work zone to form a closed space to form the virtual zone. Therefore, the exemplary instructions do not limit the scope of the present disclosure. In the example shown in FIG. 3B, the virtual zone (or the closed space) is shown with a rectangular shape. The virtual zone (or the closed space) may include any other suitable regular or irregular shapes, such as a square shape, a circle, a diamond, a triangle, etc. In some embodiments, instructions configured for controlling the moving distance and/or the rotating angle of the cleaning robot 100 to move in a moving path to form a closed space may include: 1) with the current location of the cleaning robot 100 being the starting location (e.g., point a0), controlling the cleaning robot 100 to move in a first moving direction for a first predetermined distance (which may be measured by the odometer provided on the cleaning robot 100), from point a0 to point b0, as shown in FIG. 3B. The first moving direction is the direction from point a0 to point b0, and the first predetermined distance is the distance between point a0 and point b0.

The instructions may also include: 2) controlling the cleaning robot 100 to turn in a predetermined turning direction. The predetermined turning direction may include both a rotating direction (or turning direction) and a rotating angle (or turning angle). In the example shown in FIG. 3B, the rotating direction is the counter-clockwise direction from the first moving direction (the direction from the first moving direction to the second moving direction described below), and the rotating angle is 90°. That is, at point b0, the cleaning robot 100 is controlled to turn left for 90°.

The instructions may also include 3): controlling the cleaning robot 100 to move in a second moving direction for a second predetermined distance from point b0 to point c0, as shown in FIG. 3B. The second moving direction is the direction from point b0 to point c0. The second predetermined distance is the distance between point b0 and point c0.

The instructions may also include 4): controlling the cleaning robot 100 to turn in the predetermined turning direction, which is still turning counter-clockwise for 90° in this example. In other words, at point c0, the cleaning robot 100 is controlled to turn left for 90°.

The instructions may also include 5): controlling the cleaning robot 100 to move in a third moving direction for the first predetermined distance, from point c0 to point do, as shown in FIG. 3B. The third moving direction is the direction from point c0 to point do. The third moving direction may be parallel with and opposite to the first moving direction (which is from point a0 to point b0). The first predetermined distance is the distance between point a0 and point b0, which is the same as the distance between point c0 and point do in this example.

The instructions may also include 6): controlling the cleaning robot 100 to turn in the predetermined turning direction (same as the predetermined turning direction in step 4, i.e., turning counter-clockwise for 90°). That is, at point d0, the cleaning robot 100 may be controlled to turn left for 90° to face point a0.

The instructions may also include 7): controlling the cleaning robot 100 to move in a fourth moving direction for the second predetermined distance to return to the starting location, i.e., from point do to point a0, as shown in FIG. 3B. The fourth moving direction is the direction from point do to point a0. The second predetermined distance is the distance between point do and point a0, which is the same as the distance between point b0 and point c0 in this example. As shown in FIG. 3B, when the instructions are executed by the data processing device 125, the data processing device 125 may control the cleaning robot 100 to move in a moving path in the actual work zone to form a closed space (i.e., a rectangle formed by points a0, b0, c0, and d0) that defines a virtual zone. When the virtual zone is formed, the coordinates of the points a0, b0, c0, and d0 may be known, and the locations of the boundaries of the virtual zone may be known.

The present disclosure does not limit the first predetermined distance and the second predetermined distance, which may be set based on application needs. The predetermined turning direction may include both the rotating direction and the rotating angle, which may be a left turn or a right turn. The left turn is used as an example in the above descriptions. The rotating angle of each turn may be set based on application needs, which is not limited by the present disclosure. That is, the rotating angle may not be 90°, and may be any suitable angle determined based on the application needs. For example, in some embodiments, the first predetermined distance may be 6 meters ("m"), the second predetermined distance may be 4 m, the predetermined turning direction may be the left turn, and the rotating angle may be 90°.

In some embodiments, the moving direction from point c0 to point d0 may not be parallel with the moving direction from point a0 to point b0. In some embodiments, the moving direction from point d0 to point a0 may not be parallel with the moving direction from point b0 to point c0. The closed space obtained by executing the instructions for controlling the moving distance and/or rotating angle of the cleaning robot 100 is shown in FIG. 3B. In some embodiments, the closed space defining the virtual zone may be any closed shape. That is, the third moving direction may not be parallel with the first moving direction, the fourth moving direction may not be parallel with the second moving direction, the third predetermined distance may not be the same as the first predetermined distance, and the fourth predetermined distance may not be the same as the second predetermined distance.

In some embodiments, if moving from point d0 in the fourth moving direction cannot return to point a0 due to accumulated errors of various devices (e.g., sensors, moving devices), the data processing device 125 may control the cleaning robot 100 to move from point d0 to point a0 to form a closed space regardless of whether the fourth moving direction is parallel with the second moving direction and/or whether the distance between point d0 and point a0 is the same as the second predetermined distance.

In some embodiments, when point a0 (the starting location) and the first moving direction are known, an initial virtual zone may be automatically set based on a predetermined shape and predetermined dimensions, e.g., a rectangle with a predetermined length and width. Thus, once point a0 and the first moving direction are known, coordinates of points b0, c0, and d0 may be determined, and the initial virtual zone may be formed. The initial virtual zone set by the virtual points a0, b0, c0, and d0 may or may not have obstacles located on the boundaries of the initial virtual zone. In some embodiments, after the virtual points a0, b0, c0, and d0 are known, the data processing device 125 may control the cleaning robot 100 to move along the initial virtual zone from point a0 to point b0 to point c0 to point d0 and to point a0, to verify whether there is any obstacle located on the boundaries of the initial virtual zone. When it is determined that no obstacle is located on the boundaries of the initial virtual zone, the initial virtual zone is treated as the virtual zone to be cleaned. A cleaning process may be started to clean the interior of the closed space (or virtual zone) starting from point a0. If an obstacle is located on one or more boundaries of the initial virtual zone formed by the virtual points a0, b0, c0, and d0, an actual virtual zone may be changed from the initial virtual zone, which will be described below with reference to FIG. 3C.

The technical solutions provided by the present disclosure is suitable for SLAM, for example, when there is no initial map. By dividing the actual work zone into multiple virtual zones (including expanded virtual zones described below), and by controlling the cleaning robot 100 to move inside the interior of the virtual zones and clean the interior of the virtual zones (including the expanded virtual zones described below), highly efficient cleaning of an unknown zone can be achieved with the disclosed cleaning robot and path planning, localization, mapping, and/or navigation algorithm.

Figure 3C:
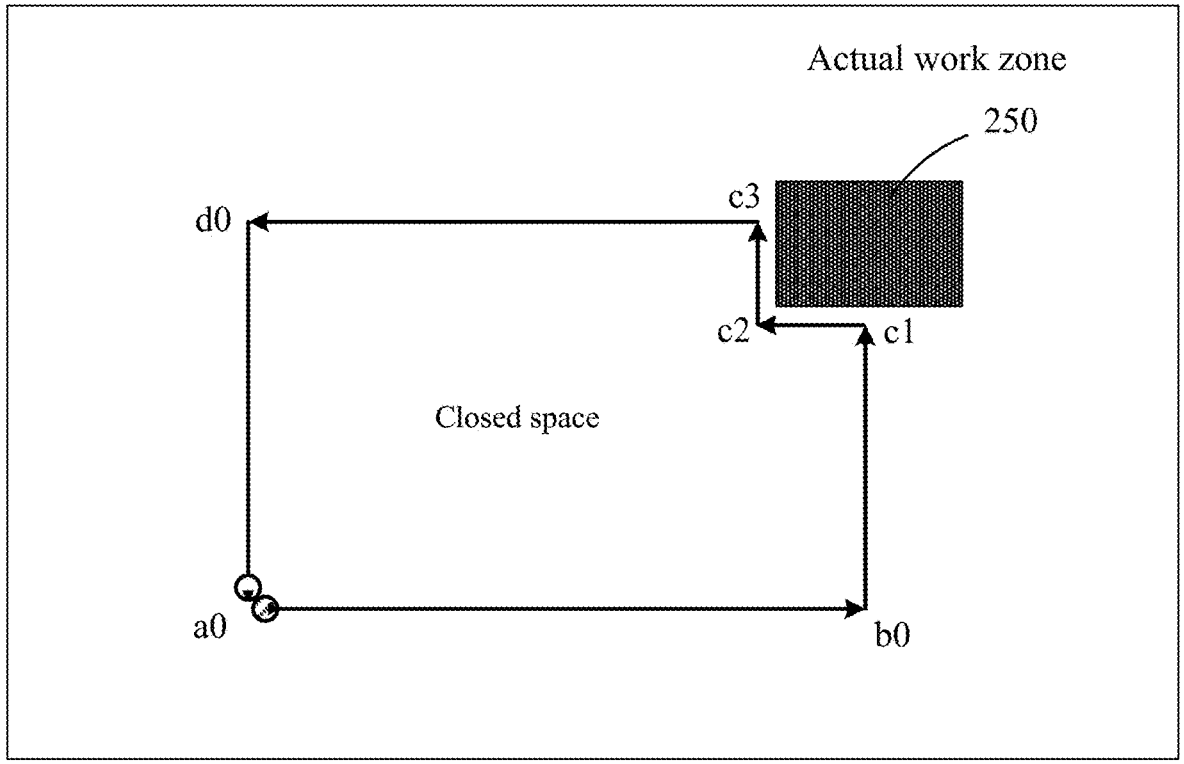
FIG. 3C illustrates a schematic diagram showing a moving path in the location and mapping algorithm executable by the cleaning robot, according to an embodiment of the present disclosure.

According to an embodiment of the cleaning robot 100, as shown in FIG. 3C, while controlling the cleaning robot 100 to move in a predetermined moving direction (which may be the first moving direction, the second moving direction, the third moving direction, or the fourth moving direction) to form a virtual zone, or to verify whether there is an obstacle located at one or more boundaries of the initial virtual zone, as described above in connection with FIG. 3B, the data processing device 125 may determine whether the cleaning robot 100 encounters an obstacle 250. For example, the data processing device 125 may determine whether the cleaning robot 100 encounters the obstacle 250 based on images captured by the monocular camera 115, and/or sensor data obtained by at least one of the collision sensor 170 or the distance sensor 175. When the obstacle 250 is encountered, additional instructions relating to obstacle encountering may be executed for controlling the moving distance and/or the rotating angle of the cleaning robot 100. For example, when the obstacle 250 is located in an area that includes (e.g., covers) point c0, and when the cleaning robot 100 encounters the obstacle 250 while moving in a predetermined moving direction from point b0 toward point c0 (e.g., the second moving direction), as shown in FIG. 3C, the cleaning robot 100 may be controlled to move along a periphery of the obstacle 250. For example, at point c1, the data processing device 125 may control the cleaning robot 100 to turn in a predetermined turning direction (which is counter-clockwise for 90° in this example) to face a direction that is substantially parallel with an periphery or edge or boundary of the obstacle 250. That is, at point c1, the data processing device 125 may determine, based on the collision signal received from the collision sensor 170 and/or image data obtained by the monocular camera 115, that the cleaning robot 100 encounters the obstacle 250. The data processing device 125 may control the cleaning robot 100 to move along the periphery (or edges, boundaries) of the obstacle 250. For example, the data processing device 125 may control the cleaning robot 100 to move in close proximity to the periphery (or edges) of the obstacle 250. In some embodiments, the data processing device 125 may control the cleaning robot 100 to move along the periphery of the obstacle 250 while keeping a constant distance from the periphery of the obstacle 250. In some embodiments, the data processing device 125 may control the cleaning robot 100 to move along the periphery of the obstacle 250 while keeping a distance within a predetermined distance range from the periphery of the obstacle 250. The data processing device 125 may control the cleaning robot 100 to move from point c1 toward point c2 along the periphery of the obstacle 250. At point c2, the data processing device 125 may control the cleaning robot 100 to turn right for 90° and continue to move from point c2 along the periphery of the obstacle 250.

While the data processing device 125 controls the cleaning robot 100 to move along the periphery of the obstacle 250 along a moving path from point c1 to point c2, and from point c2 to point c3, the data processing device 125 may compute, in real time, a first projected distance of a moving path along the periphery of the obstacle 250 projected in the second moving direction (i.e., the direction from point b0 to point c1), which is the direction in which the cleaning robot 100 was moving prior to or at a time instance when encountering the obstacle 250. The data processing device 125 may compute, in real time, a first sum of the first projected distance and a distance the cleaning robot 100 already traversed in the second moving direction (i.e., the direction from point b0 to point c1) up to the time instance when encountering the obstacle. The data processing device 125 may determine, in real time, whether the first sum is equal to or greater than a first predetermined value (e.g., the second predetermined distance (i.e., the distance from point b0 to point c0 as shown in FIG. 3B)). In the example shown in FIG. 3C, the first sum is the distance between point b0 and point c1 plus the distance between point c2 and point c3. Based on a determination that the first sum is equal to or greater than the first predetermined value (e.g., the second predetermined distance), the data processing device 125 may control the cleaning robot 100 to stop moving along the periphery of the obstacle 250 at point c3. The data processing device 125 may control the cleaning robot 100 to turn to a direction perpendicular to the second moving direction (the direction from point b0 to point c1). That is, the data processing device 125 may control the cleaning robot 100 to turn left at point c3 for 90° to the third moving direction perpendicular to the second moving direction. The data processing device 125 may control the cleaning robot 100 to move from point c3 in the third moving direction toward point do. The third moving direction may be parallel with and opposite to the first moving direction.

As the data processing device 125 control the cleaning robot 100 to move along the periphery of the obstacle 250 in the moving path (from point c1 to c2 to c3), the data processing device 125 may also compute, in real time, a second projected distance of the moving path along the periphery of the obstacle 250 projected in a direction perpendicular to the predetermined moving direction (e.g., the first moving direction from point a0 to point b0, or the third moving direction from point c3 to point do, which is perpendicular to the second moving direction from point b0 to point c1). In the example shown in FIG. 3C, the second projected distance of the moving path along the periphery of the obstacle 250 projected in the first moving direction or the third moving direction is the distance between point c1 and point c2. While the data processing device 125 controls the cleaning robot 100 to move from point c3 toward point do in the third moving direction, the data processing device 125 may compute, in real time, a second sum of a distance traversed from c3 in the process of moving from point c3 to point do in the third moving direction and the second projected distance. In the example shown in FIG. 3C, the second sum is the distance between point c1 and point c2 plus the distance between point c3 and any point between point c3 and point do (including point d0) (or in other words, between point c3 and a current location of the cleaning robot 100 while moving from point c3 in the third moving direction to point d0). The data processing device 125 may determine, in real time, whether the second sum is equal to or greater than a second predetermined value. In the example shown in FIG. 3C, the second predetermined value may be the distance between point a0 and point b0 (i.e., the first predetermined distance) or between point c0 to do (i.e., the third predetermined distance). Based on a determination that the second sum is equal to or greater than the second predetermined value, the data processing device 125 may control the cleaning robot 100 to turn, at point d0, to a direction perpendicular to the third moving direction (also parallel with and opposite to the second moving direction), i.e., to turn left for 90° to the fourth moving direction. The data processing device 125 may control the cleaning robot 100 to move in the fourth moving direction for the second predetermined distance (i.e., the distance from point b0 to point c0 as shown in FIG. 3B) toward point a0 to form a closed space that defines a virtual zone, as described above in connection with FIG. 3B. In some embodiments, if moving from point do in the fourth moving direction cannot return to point a0 due to accumulated errors of various devices (e.g., sensors, moving devices), the data processing device 125 may control the cleaning robot 100 to move from point do to point a0 to form a closed space regardless of whether the fourth moving direction is parallel with the second moving direction and/or whether the distance between point do and point a0 is the same as the second predetermined distance. As shown in FIG. 3C, when there is an obstacle located at the boundary of the initial virtual zone (formed by points a0, b0, c0, and d0), the actual virtual zone to be cleaned may be changed from the initial virtual zone. The actual virtual zone to be cleaned may be formed by points a0, b0, c1, c2, c3, and do.

As described above in connection with FIG. 3C, while the cleaning robot 100 moves in a predetermined moving direction (e.g., the second moving direction from point b0 to point c0), the cleaning robot 100 may encounter the obstacle 250. While the data processing device 125 controls the cleaning robot 100 to move along the periphery of the obstacle 250, the data processing device 125 may compute the first projected distance of a moving path along the periphery of the obstacle 250 projected in the predetermined moving direction (e.g., the second moving direction from point b0 to point c1), which is the direction in which the cleaning robot 100 was moving prior to or at a time instance when encountering the obstacle 250. The data processing device 125 may compute, in real time, the first sum of the first projected distance and a distance the cleaning robot 100 already traversed in the second moving direction (i.e., the direction from point b0 to point c1) up to the time instance when encountering the obstacle. The data processing device 125 may determine, in real time, whether the first sum is equal to or greater than a first predetermined value (e.g., the second predetermined distance (i.e., the distance from point b0 to point c0 as shown in FIG. 3B)). In the embodiment shown in FIG. 3C, the obstacle 250 is presumed to cover the point c0. That is, the first sum is presumed to reach or exceed the first predetermined value while the cleaning robot 100 moves along a portion c2-c3 of the periphery of the obstacle 250. In some embodiments, the obstacle 250 may not cover the point c0. Instead, the obstacle 250 may be located on the boundary between point b0 and point c0, as shown in FIG. 3D.

Figure 3D:
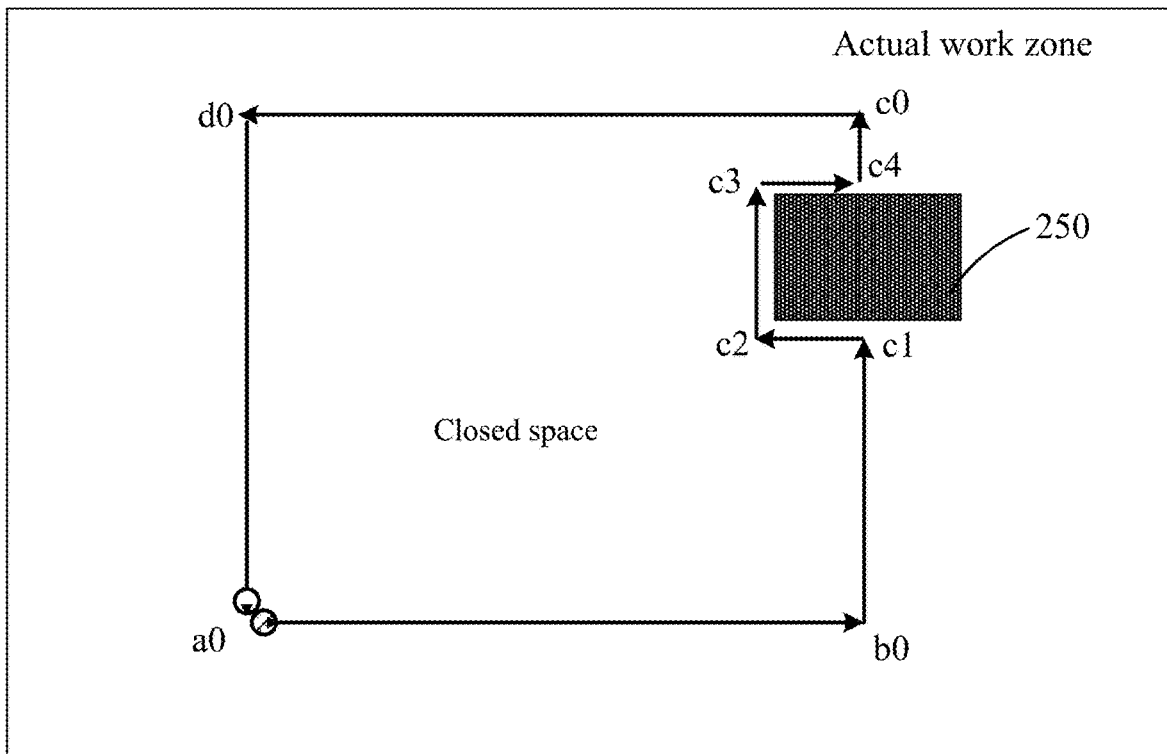
FIG. 3D illustrates a schematic diagram showing a moving path in the location and mapping algorithm executable by the cleaning robot, according to an embodiment of the present disclosure.

In the scenario shown in FIG. 3D, the first sum may not reach or exceed the first predetermined value (e.g., the distance from point b0 to point c0) while the cleaning robot 100 moves along the portion c2-c3 of the periphery of the obstacle 250. Presuming point c3 is located at a corner of the obstacle 250, then at point c3, the data processing device 125 may control the cleaning robot 100 to turn right to continue moving along another portion c3-c4 of the periphery of the obstacle 250. While controlling the cleaning robot 100 to move along the portion c3-c4 of the periphery of the obstacle 250, the data processing device 125 continues to compute, in real time, the first projected distance and the first sum described above in the direction of point b0 to point c0 (or point c1), and the second projected distance of the moving path along the periphery projected in a direction perpendicular to the predetermined moving direction (e.g., the first moving direction from point a0 to point b0 perpendicular to the second moving direction from point b0 to point c0). At point c4, the data processing device 125 may determine that the second projected distance is substantially 0, and the first sum is still smaller than the first predetermined value, the data processing device 125 may control the cleaning robot 100 to stop moving along the periphery of the obstacle 250, and to turn to the predetermined moving direction (i.e., the second moving direction from point b0 to point c0 (or point c1)) and continue to move along the predetermined moving direction (e.g., from point b0 to point c0) toward point c0. At point c0, the data processing device 125 may control the cleaning robot 100 to turn to the third moving direction (from point c0 to point d0) and to move toward point do. Descriptions of the processes of controlling the cleaning robot 100 to move from point do to point a0 to form a closed space that defines a virtual zone can refer to the above descriptions rendered in connection with FIG. 3C.

Figure 3E:
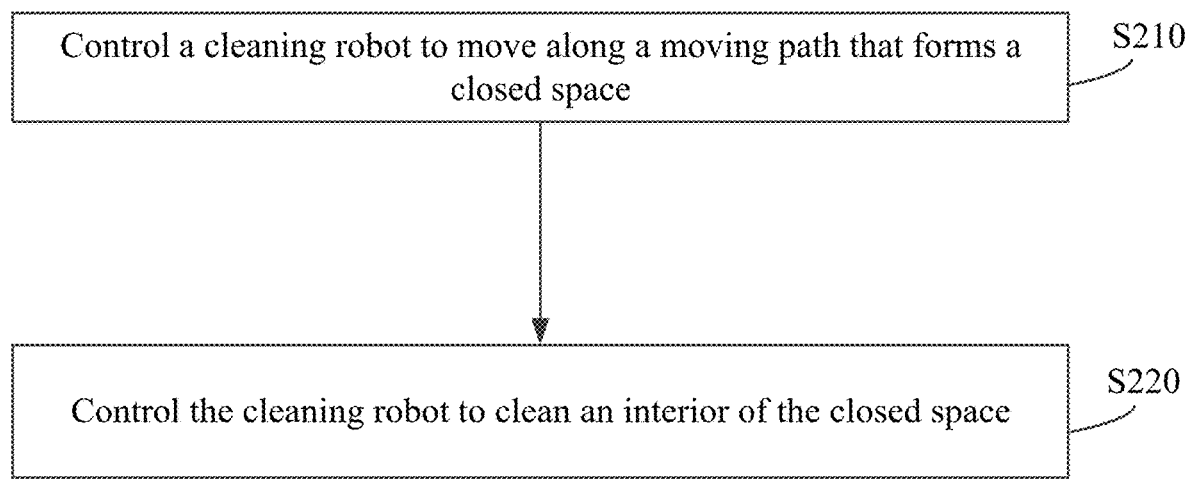
FIG. 3E illustrates a flowchart showing processes of a localization and mapping algorithm executable by the cleaning robot, according to an embodiment of the present disclosure.

In some embodiments, as shown in FIG. 3E, controlling the cleaning robot 100 to move inside the virtual zone and clean the virtual zone inside the actual work zone in step S200 may include:

Step S210: controlling the cleaning robot 100 to move along a moving path that forms a closed space. The closed space defines a virtual zone. A boundary of the closed space is a boundary of the virtual zone. For example, the data processing device 125 may execute instructions configured for controlling the moving distance and/or rotating angle of the cleaning robot 100, thereby controlling the movement of the cleaning robot 100 along the moving path that forms the closed space. The processes of executing the instructions can refer to the above descriptions, which are not repeated. The present disclosure does not limit the shape of the closed space (or virtual zone) configured by the instructions.

Step S220: controlling the cleaning robot 100 to move inside an interior of the closed space and clean the interior of the closed space. For example, the data processing device 125 may execute instructions configured to control the cleaning robot 100 to move within the closed space in a predetermined cleaning pattern while cleaning the floor.

Figure 3F:
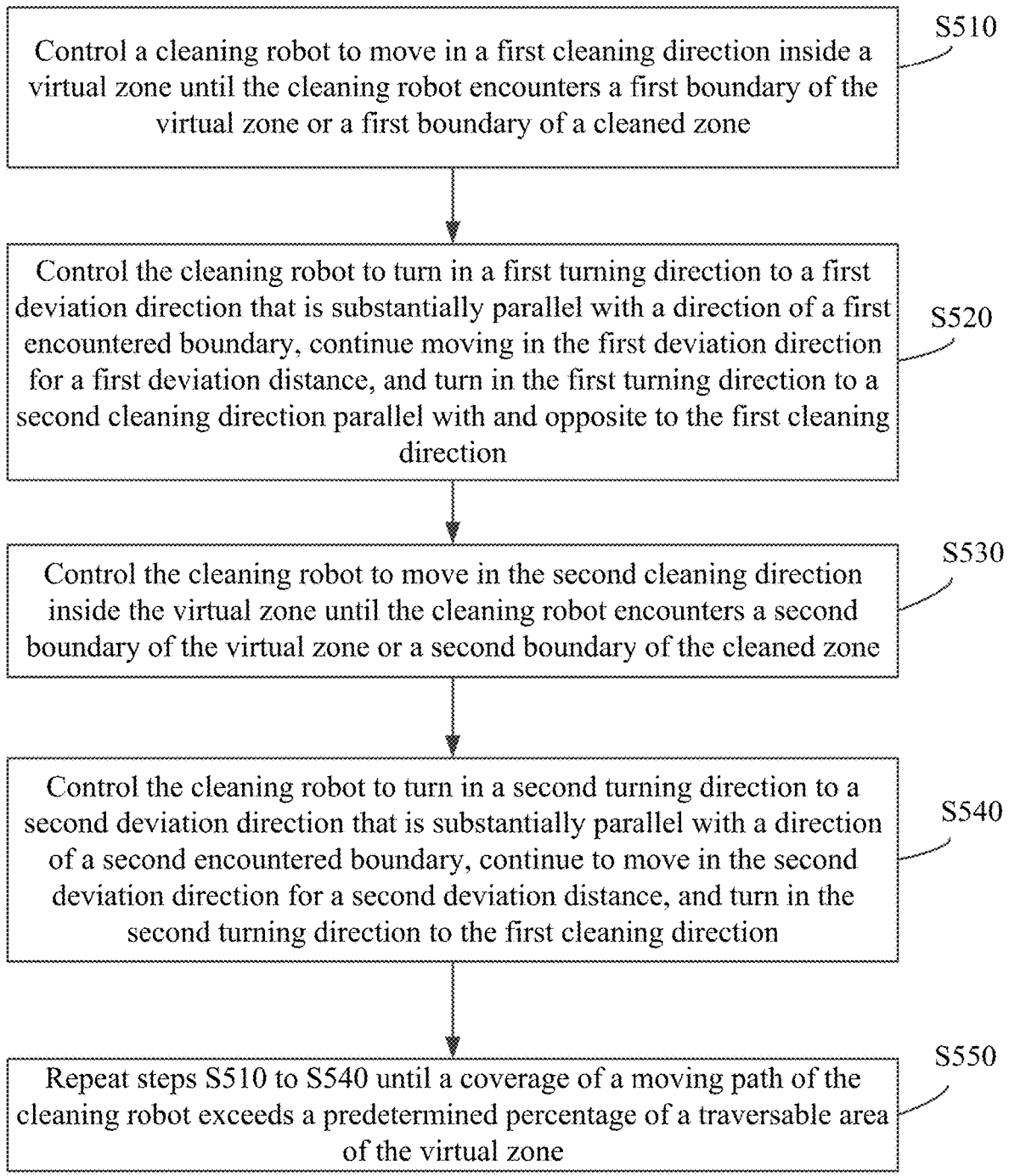
FIG. 3F illustrates a flowchart showing processes relating to a moving path of a localization and mapping algorithm executable by the cleaning robot, according to an embodiment of the present disclosure.

In an embodiment of the present disclosure, the cleaning robot 100 may adopt an S-shaped cleaning pattern, a cornrow cleaning pattern, a snake shaped cleaning pattern, a rectangular-pulse shaped cleaning pattern, or any other suitable cleaning pattern, to clean the interior of the closed space. The data processing device 125 may control the cleaning robot 100 to move in the cleaning pattern while cleaning the floor. FIG. 3F is a flowchart illustrating processes (or a method) for controlling the cleaning robot 100 to clean the interior of the closed space. As shown in FIG. 3F, the cleaning processes (or method) may include:

Step S510: controlling the cleaning robot 100 to move in a first cleaning direction inside the virtual zone until the cleaning robot 100 encounters a first boundary of the virtual zone or a first boundary of a cleaned zone. In some embodiments, the data processing device 125 may control the cleaning robot 100 to move to approach the first boundary of the virtual zone, e.g., to arrive at a location that has a predetermined distance from the first boundary of the virtual zone.

In some embodiments, the first cleaning direction may be set based on a direction of a boundary where a current location of the cleaning robot 100 is located. The present disclosure does not limit the first cleaning direction. Prior to executing step S510, the method may further include controlling the cleaning robot 100 to move to an end of a boundary of the virtual zone. In some embodiments, the method may include controlling the cleaning robot 100 to move to an end of a boundary of the virtual zone that is closest to the current location of the cleaning robot 100.

Step S520: controlling the cleaning robot 100 to turn in a first turning direction to a first deviation direction that is substantially parallel with a direction of a first encountered boundary, continue to move in the first deviation direction for a first deviation distance, and turn in the first turning direction to a second cleaning direction parallel with and opposite to the first cleaning direction. The first encountered boundary is the first boundary of the virtual zone or the first boundary of the cleaned zone that is encountered by the cleaning robot 100 while moving in the first cleaning direction in step S510.

In some embodiments, the first turning direction may include a rotating direction and/or a rotating angle. The first turning direction can be a left turn, or a right turn. The specific rotating direction and rotating angle may be pre-set by a program (or instructions), or may be determined based on characteristics of the configuration (or shape) of the virtual zone. The first deviation distance may be a projected distance of a moving path in the first deviation direction projected in a direction perpendicular to the first cleaning direction.

Step S530: controlling the cleaning robot 100 to move in the second cleaning direction inside the virtual zone until the cleaning robot 100 encounters a second boundary of the virtual zone or a second boundary of the cleaned zone.

Step S540: controlling the cleaning robot 100 to turn in a second turning direction to a second deviation direction that is substantially parallel with a direction of a second encountered boundary, to continue to move in the second deviation direction for a second deviation distance, and to turn in the second turning direction to the first cleaning direction. The second turning direction may include a rotating direction and/or a rotating angle. The second turning direction can be a left turn, or a right turn. The specific rotating direction and rotating angle may be pre-set by a program (or instructions), or may be determined based on characteristics of the configuration (or shape) of the virtual zone. The second encountered boundary is the second boundary of the virtual zone or the second boundary of the cleaned zone, which is encountered by the cleaning robot 100 in step S530. The second deviation distance may be a projected distance of a moving path in the second deviation direction projected in a direction perpendicular to the second cleaning direction.

In some embodiments, the second turning direction may be opposite to the first turning direction. The first deviation direction and the second deviation direction may be substantially the same (or parallel with one another), or may be different directions. In some embodiments, the first deviation distance and the second deviation distance may be substantially the same, or may be different. The first deviation distance may be a projected distance of the moving path in the first deviation direction projected in a direction perpendicular to the first cleaning direction. The second deviation distance may be a projected distance of the moving path in the second deviation direction projected in a direction perpendicular to the second cleaning direction. In some embodiments, the first deviation distance and the second deviation distance may be substantially the same as, or slightly greater than, a width of a main brush, which may be 10 cm to 15 cm. The configuration of the first deviation distance and the second deviation distance can enable the cleaning robot 100 to avoid missing uncleaned zones when performing cleaning in two adjacent cleaning directions during a cleaning process. For example, the first deviation distance and the second deviation distance may be configured such that adjacent zones cleaned during the movement in the first cleaning direction and during the movement in the second cleaning direction share a boundary or at least partially overlap one another, thereby avoiding missing any uncleaned zones.

Step S550: repeating steps S510 to S540, until a coverage of a moving path of the cleaning robot 100 exceeds a predetermined percentage of a traversable area of the virtual zone, or until the data processing device determines that the cleaning robot is surrounded by one or more boundaries of the virtual zone, one or more boundaries of one or more cleaned zones, or one or more obstacles.

Figure 3G:
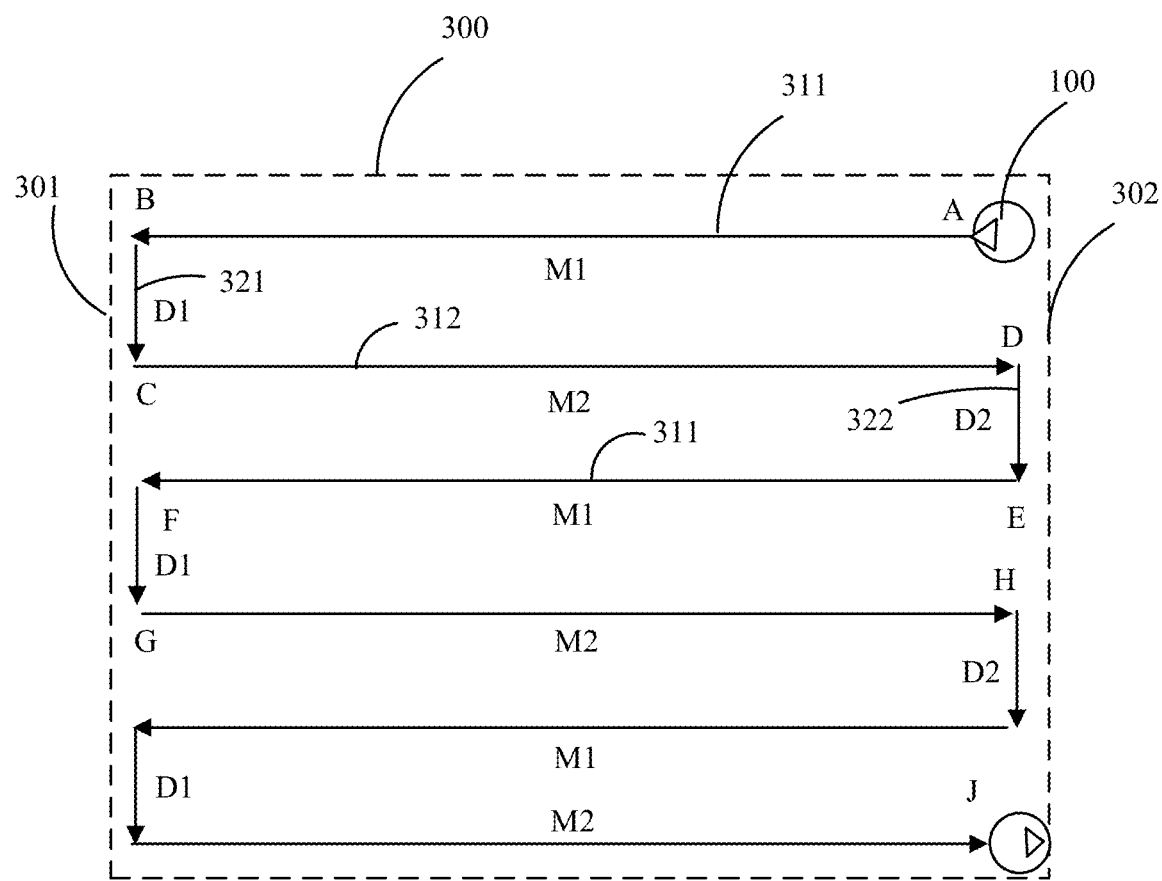
FIG. 3G illustrates processes of controlling the cleaning robot to clean a virtual zone, according to an embodiment of the present disclosure.

FIG. 3G illustrates processes of controlling the cleaning robot 100 to clean a virtual zone 300 based on a predetermined cleaning pattern, according to an embodiment of the present disclosure. For illustrative purposes, the virtual zone 300 is shown as having a rectangular shape. The virtual zone 300 may be in any other suitable shapes. Also for illustrative purposes, it is presumed that the virtual zone 300 does not include an obstacle. The virtual zone has a first boundary 301 at the left side in the view shown in FIG. 3G, and a second boundary 302 at the right side in the view shown in FIG. 3G. The exemplary cleaning pattern shown in FIG. 3G is an S-shaped cleaning pattern (which may also be referred to as a rectangular-pulse shaped cleaning pattern). It is understood that while the data processing device 125 controls the cleaning robot 100 to move along the cleaning pattern in the virtual zone 300, the data processing device 125 may also control the cleaning robot 100 to clean the floor while the cleaning robot 100 moves.

At the start of the cleaning processes, the data processing device 125 may control the cleaning robot 100 to start moving from point A adjacent the second boundary 302 (or a user may place the cleaning robot 100 at point A). The data processing device 125 may control the cleaning robot 100 to move from point A in a first cleaning direction 311. The data processing device 125 may control the cleaning robot 100 to move in the first cleaning direction 311 until the data processing device 125 determines that the cleaning robot 100 encounters the first boundary 301 of the virtual zone 300. Various methods may be used to determine that the cleaning robot 100 has encountered the first boundary 301 of the virtual zone, as described above.

In some embodiments, when the data processing device 125 determines that the cleaning robot 100 encounters the first boundary 301, the cleaning robot 100 may be at point B, which is away from the first boundary 301 at a predetermined gap or distance. At point B, the data processing device 125 may control the cleaning robot 100 to turn in a first turning direction (e.g., left turn, or counter-clockwise turn for 90°) to a first deviation direction 321. The first deviation direction 321 may be substantially parallel with the direction of the first boundary 301 that is encountered by the cleaning robot 100. The data processing device 125 may control the cleaning robot 100 to continue to move in the first deviation direction 321 for a first deviation distance D1 to arrive at point C. At point C, the data processing device 125 may control the cleaning robot 100 to turn in the first turning direction (e.g., left turn or counter-clockwise for) 90° to a second cleaning direction 312. The second cleaning direction 312 may be parallel with and opposite to the first cleaning direction 311.

The data processing device 125 may control the cleaning robot 100 to move in the second cleaning direction 312 until the data processing device 125 determines that the cleaning robot 100 encounters the second boundary 302 of the virtual zone 300. The distance traversed by the cleaning robot 100 from point C to point D may be M2. When the virtual zone 300 has a rectangular or square shape, the distances M1 and M2 may be substantially the same. When the virtual zone 300 has other types of shapes, the distances M1 and M2 may not be the same. At point D, the data processing device 125 may control the cleaning robot 100 to turn in a second turning direction (e.g., right turn, or clockwise turn for 90°) to a second deviation direction 322. The second deviation direction 322 may be substantially parallel with the direction of the second boundary 302 that is encountered by the cleaning robot 100. In some embodiments, the second deviation direction 322 may be parallel with the first deviation direction 321, as shown in FIG. 3G.

The data processing device 125 may control the cleaning robot 100 to continue to move in the second deviation direction 322 for a second deviation distance D2 to arrive at point E. The second deviation distance D2 and the first deviation distance D1 may be the same or may be different. At point E, the data processing device 125 may control the cleaning robot 100 to turn in the second turning direction (e.g., right turn, or clockwise for 90°) to the first cleaning direction 311. The data processing device 125 may control the cleaning robot 100 to move from point E in the first cleaning direction 311 to arrive at point F. The processes may be repeated for the remaining portions of the virtual zone until a coverage of the moving path of the cleaning robot 100 exceeds a predetermined percentage of the traversable area of the virtual zone 300, or until the data processing device 125 determines that the cleaning robot 100 is at point J where the cleaning robot 100 is surrounded by one or more boundaries of the virtual zone, one or more boundaries of one or more cleaned zones, or one or more obstacles, as shown in FIG. 3G.

In some embodiments, because the size of the virtual zone 300 is known after the virtual zone 300 is set, the dimensions (e.g., the length and the width) of the virtual zone 300 may be known values. Thus, in some embodiments, when the cleaning robot 100 starts moving near a corner point (e.g., the right upper corner point), instead of determining whether the cleaning robot 100 encounters the first boundary 301 or the second boundary 302 of the virtual zone, the data processing device 125 may control the cleaning robot 100 to move horizontally for a predetermined distance (e.g., the length of the virtual zone 300) from point A to arrive at point B, and may control the cleaning robot 100 to turn at point B in the counter-clockwise direction, or from point C to arrive at point D and control the cleaning robot 100 to turn at point D in the clockwise direction.

In some embodiments, if the cleaning robot 100 encounters an obstacle when moving in a first predetermined cleaning direction within the virtual zone 300, the method may also include controlling the cleaning robot 100 to move along the periphery of the obstacle, computing in real time a projected distance of a moving path along the periphery of the obstacle projected in a direction perpendicular to the first predetermined cleaning direction. The first predetermined cleaning direction may be the cleaning direction in which the cleaning robot was moving prior to or when encountering the obstacle. When the projected distance is equal to or greater than a third deviation distance, the method may include controlling the cleaning robot 100 to turn to a second predetermined cleaning direction opposite to the first predetermined cleaning direction and continue to move in the second predetermined cleaning direction. When the projected distance is substantially equal to 0, the method may also include controlling the cleaning robot 100 to turn to the first predetermined cleaning direction and continue to move in the first predetermined cleaning direction. The processes are further explained below with reference to exemplary cleaning patterns and obstacles shown in FIGS. 3H-3J.

Figure 3H:
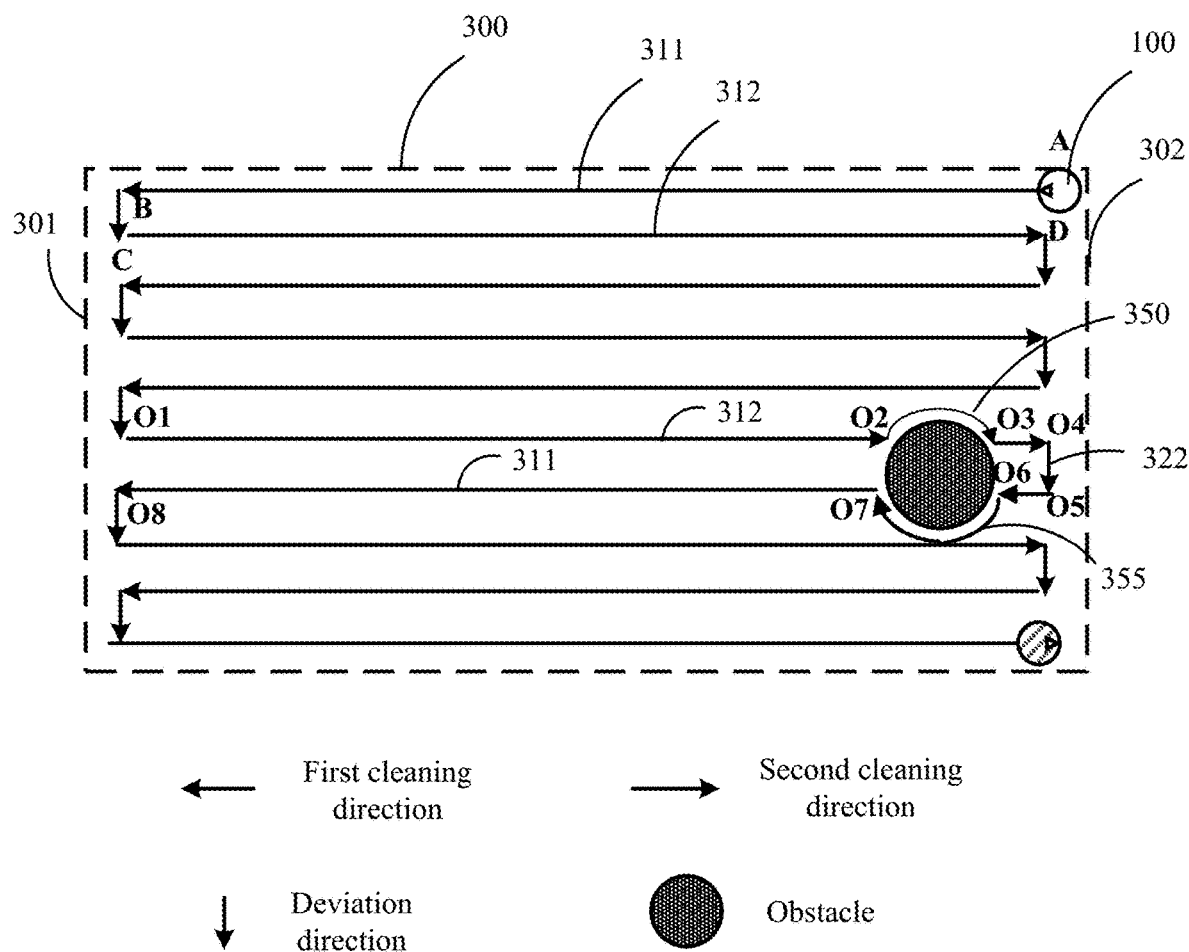
FIG. 3H illustrates processes of controlling the cleaning robot to clean a virtual zone including an obstacle, according to an embodiment of the present disclosure.

FIG. 3H illustrates processes for controlling the cleaning robot 100 to clean the virtual zone 300 when there is an obstacle inside the virtual zone 300, according to an embodiment of the present disclosure. In the example shown in FIG. 3H, the obstacle is shown with a round (or circular) shape. The obstacle may include other regular or irregular shapes. As shown in FIG. 3H, the cleaning robot 100 may start moving inside the virtual zone 300 (while cleaning the virtual zone 300) from point A, in the S-shaped cleaning pattern, as described above in connection with FIG. 3G. In the example cleaning pattern shown in FIG. 3G, the first deviation direction and the second deviation direction are the same, i.e., the vertical direction indicated in FIG. 3G. For illustrative purposes, the first deviation distance and the second deviation distance in the example shown in FIG. 3H are also shown to be the same.

When the cleaning robot 100 moves from point O1 to point O3 in a first predetermined cleaning direction (in this example, the first predetermined cleaning direction is the second cleaning direction 312), the cleaning robot 100 may encounter the obstacle at point O2. The data processing device 125 may determine that the cleaning robot 100 has encountered the obstacle based on a signal received from at least one of the collision sensor 170, the distance sensor 175, or images captured by the monocular camera 115. The data processing device 125 may control the cleaning robot 100 to move along a periphery 350 of the obstacle. In the example shown in FIG. 3H, the periphery 350 of the obstacle may be an arc edge of the circular shape of the obstacle. While the cleaning robot 100 moves from point O2 to point O3 along the arc edge of the obstacle, the data processing device 125 may compute, in real time, a projected distance of a moving path along the periphery 350 of the obstacle projected in a direction perpendicular to the first predetermined cleaning direction (i.e., perpendicular to the second cleaning direction 312). The first predetermined cleaning direction may be a cleaning direction in which the cleaning robot 100 was moving prior to or when encountering the obstacle, i.e., the second cleaning direction 312. In the example shown in FIG. 3H, the direction perpendicular to the second cleaning direction 312 is the vertical direction. Thus, the projected distance of the moving path is the projected distance of the moving path in the vertical direction.

During the process of moving from point O2 to point O3, the data processing device 125 may compute, in real time, the projected distance of the moving path projected in the vertical direction, which is perpendicular to the first predetermined cleaning direction (i.e., perpendicular to the second cleaning direction 312). When the cleaning robot 100 moves from point O2 to point O3, the projected distance of the moving path projected in the vertical direction increases from substantially 0 (at point O2) to a maximum value and then decreases from the maximum value to substantially 0 (at point O3). At point O3, the projected distance is substantially 0. When determining that the projected distance is substantially 0 at point O3, the data processing device 125 may control the cleaning robot 100 to turn to the first predetermined cleaning direction (i.e., the second cleaning direction 312) and to continue to move in the first predetermined cleaning direction until the cleaning robot 100 encounters the second boundary 302 of the virtual zone 300 at point O4.

At point O4, the data processing device 125 may control the cleaning robot 100 to turn in the second turning direction (e.g., right turn, or clockwise turn for 90°) to the second deviation direction 322. The data processing device 125 may control the cleaning robot 100 to move in the second deviation direction 322 for the second deviation distance D2 to arrive at point O5. At point O5, the data processing device 125 may control the cleaning robot 100 to turn in the second turning direction (e.g., right turn, or clockwise turn for 90°) to a second predetermined cleaning direction (in this example, the second predetermined cleaning direction is the first cleaning direction 311). The data processing device 125 may control the cleaning robot 100 to move in the second predetermined cleaning direction (i.e., the first cleaning direction 311) from point O5 toward point O6.

At point O6, the cleaning robot 100 encounters the obstacle again, and the data processing device 125 may control the cleaning robot 100 to move along a periphery 355 of the obstacle. While the cleaning robot 100 moves from point O6 along the periphery 355, the data processing device 125 may compute, in real time, a projected distance of a moving path along the periphery 355 projected in a direction perpendicular to the second predetermined cleaning direction (i.e., perpendicular to the first cleaning direction 311). The second predetermined distance is a cleaning direction in which the cleaning robot 100 was moving prior to or when encountering the obstacle, i.e., the first cleaning direction 311 from point O5 to point O6. In the example shown in FIG. 3H, the direction perpendicular to the second predetermined cleaning direction (i.e., the first cleaning direction 311) is the vertical direction, or the second deviation direction 322. When the cleaning robot 100 moves from point O6 to point O7, the projected distance of the moving path along the periphery 355 in the vertical direction may first increase from substantially 0 (at point O6) to a maximum value, and then decrease from the maximum value to substantially 0 (at point O7).

At point O7, when the data processing device 125 determines that the projected distance of the moving path along the periphery 355 is substantially 0, the data processing device 125 may control the cleaning robot 100 to turn to the second predetermined cleaning direction (i.e., the first cleaning direction 311). The data processing device 125 may control the cleaning robot 100 to move in the second predetermined cleaning direction (i.e., the first cleaning direction 311) until the cleaning robot 100 encounters the first boundary 301 of the virtual zone 300. The descriptions of the processes for controlling the cleaning robot 100 in other portions of the virtual zone 300 can refer to the above descriptions of FIG. 3G.

Still referring to FIG. 3H, as described above in connection with FIG. 3G, when the virtual zone 300 is a rectangular or square shape, the dimensions (e.g., length and width) of the virtual zone are known. Thus, when controlling the cleaning robot 100 to move horizontally, the data processing device 125 may determine when to control the cleaning robot 100 to turn (e.g., at point B, point D) based on a determination of whether the cleaning robot 100 has traversed a predetermined distance (which may be the length or width of the virtual zone 300), rather than based on a determination of whether the cleaning robot 100 encounters the boundary 301 or 302 of the virtual zone 300. For example, while the data processing device 125 controls the cleaning robot 100 to move from point O2 to point O3 along the periphery 350 of the obstacle, the data processing device 125 may compute, in real time, a projected distance of a moving path along the periphery 350 projected in the second cleaning direction 312. The data processing device 125 may determine a sum of the projected distance in the second cleaning direction and a distance traversed in the second cleaning direction 312 is equal to or greater than the predetermined distance. As the cleaning robot 100 continues to move from point O3 to point O4, the data processing device continues to determine whether a sum of the projected distance of the moving path along the periphery 350 projected in the second cleaning direction 312, and the distance traversed in the second cleaning direction 312 (including the distance from point O1 to point O2, and the distance from point O3 to the current location of the cleaning robot 100), is equal to or greater than the predetermined distance. When the sum is equal to or greater than the predetermined distance, the data processing device 125 may control the cleaning robot 100 to turn at point O4 clockwise toward point O5.

Figure 3I:
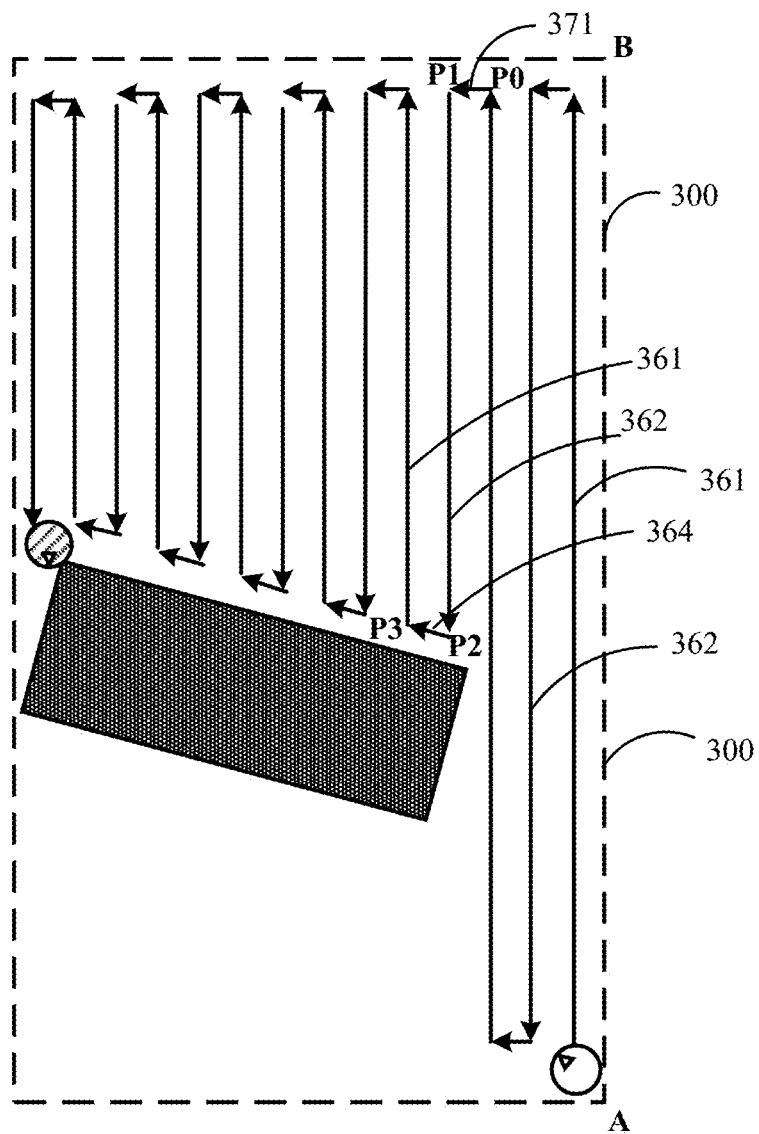
FIG. 3I illustrates processes of controlling the cleaning robot to clean a virtual zone including an obstacle, according to an embodiment of the present disclosure.

FIG. 3I illustrates processes for controlling the cleaning robot 100 to clean the virtual zone 300 when there is an obstacle inside the virtual zone 300, according to an embodiment of the present disclosure. In the example shown in FIG. 3H, the obstacle is shown with a rectangle shape. The obstacle may include other shapes, such as an irregular shape. The cleaning pattern may be an S-shaped cleaning pattern, as described above. In the S-shaped cleaning pattern, a first cleaning direction 361, a second cleaning direction 362, and a deviation direction 371 are in the directions shown in FIG. 3I. The first deviation distance and the second deviation distance in the horizontal direction may be the same, which is a distance between point P0 and point P1. The processes of controlling the cleaning robot 100 to move from point P0 to point P1, and from point P1 to point P2 can refer to the above descriptions of the S-shaped cleaning pattern shown in FIG. 3G.

When the cleaning robot 100 moves from point P1 to point P2 in a predetermined cleaning direction (e.g., the second cleaning direction 362), the cleaning robot 100 may encounter the obstacle. Point P2 may have a predetermined gap or distance from the periphery (e.g., edge) of the obstacle. At point P2, the data processing device 125 may control the cleaning robot 100 to turn in a first predetermined turning direction (e.g., right turn for an angle greater than 90°) to move in a direction 364 along the periphery of the obstacle. While moving from point P2 along the periphery of the obstacle, the data processing device 125 may compute, in real time, a projected distance of a moving path along the periphery projected in a direction perpendicular to the predetermined cleaning direction. The predetermined cleaning direction may be a cleaning direction in which the cleaning robot 100 was moving prior to or when encountering the obstacle, i.e., the second cleaning direction 362. In this example, the direction perpendicular to the predetermined cleaning direction (i.e., the second cleaning direction 362) is the horizontal direction (e.g., or the deviation direction 371). It is understood that when the obstacle is located at the top portion of the virtual zone 300 in the view of FIG. 3I, the predetermined cleaning direction may be the first cleaning direction 361. That is, the cleaning robot may encounter the obstacle while moving in the first cleaning direction 361 to clean the floor. Thus, the projected distance of the moving path from point P2 to point P3 is the projected distance in the deviation direction 371.

The data processing device 125 may determine whether the projected distance of the moving path along the periphery of the obstacle is equal to or greater than a predetermined deviation distance or a third deviation distance, which may be the same as the first deviation distance in the example shown in FIG. 3I, i.e., the distance between P0 and P1, or may be the same as a second deviation distance, i.e., the distance between P2 to P3 projected in a direction perpendicular to the second cleaning direction 362. In the example shown in FIG. 3I, the first deviation distance and the second deviation distance may be the same. Based on a determination that the projected distance of the moving path along the periphery of the obstacle is equal to or greater than the third deviation distance, the data processing device 125 may control the cleaning robot 100 to turn, at point P3, in a second predetermined turning direction (e.g., right turn in an angle less than 90°) to a cleaning direction parallel with and opposite to the predetermined cleaning direction (e.g., the second cleaning direction 362). That is, the data processing device 125 may control the cleaning robot 100 to turn to the first cleaning direction 361 that is parallel with and opposite to the second cleaning direction 362. The data processing device 125 may control the cleaning robot 100 to continue to move in the first cleaning direction 361. At other time instances when the cleaning robot 100 encounters the obstacle again, the same processes may be repeated.

Figure 3J:
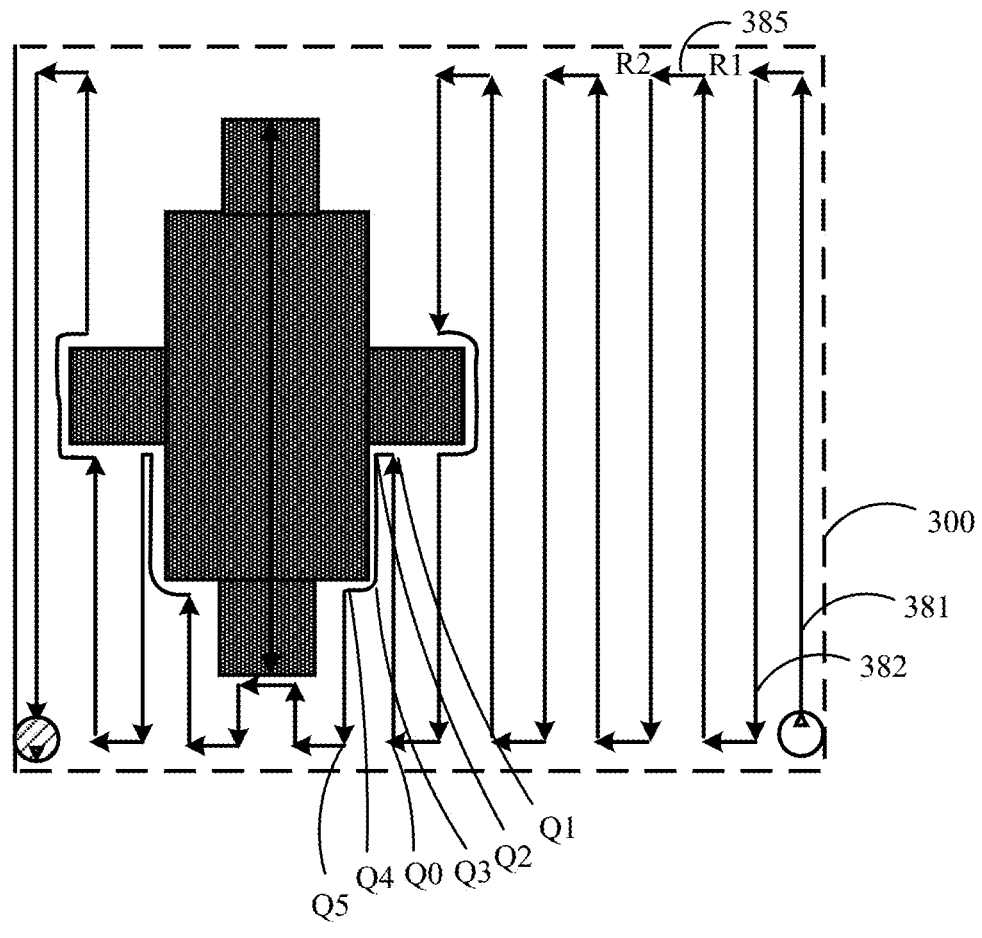
FIG. 3J illustrates processes of controlling the cleaning robot to clean a virtual zone including an obstacle, according to an embodiment of the present disclosure.

FIG. 3J illustrates processes for controlling the cleaning robot 100 to clean the virtual zone 300 when there is an obstacle inside the virtual zone 300, according to an embodiment of the present disclosure. In this example, the obstacle has a shape as shown in FIG. 3J. When the cleaning robot 100 moves from point Q0 in a first cleaning direction 381, the cleaning robot 100 may encounter a first portion of the obstacle at point Q1. The data processing device 125 may control the cleaning robot 100 to turn left for 90° to move along a first portion of the periphery of the obstacle. At point Q2, the data processing device 125 may determine that the cleaning robot 100 encounters a second portion of the obstacle, and may control the cleaning robot 100 to turn left for 90° to move along a second portion of the periphery of the obstacle. At point Q3, the data processing device 125 may control the cleaning robot 100 to turn right for 90° to continue to move along a third portion of the periphery of the obstacle.

While moving along the periphery of the obstacle starting from point Q1, the data processing device 125 may compute, in real time, a projected distance of a moving path along the periphery of the obstacle projected in a direction perpendicular to a predetermined cleaning direction. The predetermined cleaning direction may be a direction in which the cleaning robot 100 was moving prior to or when encountering the obstacle, i.e., a direction perpendicular to the first cleaning direction 381. The direction perpendicular to the first cleaning direction 381 from point Q0 to point Q1 is parallel with the deviation direction 385. Thus, while the cleaning robot 100 moves from Q1 to Q2 to Q3 to Q4, the data processing device 125 continues to compute, in real time, the projected distance of the moving path along different portions of the periphery of the obstacle in the direction perpendicular to the first cleaning direction 381.

At point Q3, the data processing device 125 may determine that the projected distance of the moving path along the periphery of the obstacle in the deviation direction 385 is greater than or equal to a predetermined deviation distance (e.g., the same as the deviation distance between point R1 and point R2). Thus, at point Q4, the data processing device 125 may control the cleaning robot 100 to turn in a predetermined direction (e.g., left turn for 90°) to the second cleaning direction 382. The data processing device 125 may control the cleaning robot 100 to move in the second cleaning direction 382 until the cleaning robot 100 encounters a boundary of the virtual zone 300. The descriptions of controlling the cleaning robot 100 to move in other portions of the virtual zone 300 outside of the obstacle are similar to those described above with reference to FIG. 3G.

A person having ordinary skills in the art may use other methods to control the cleaning robot 100 to move inside the interior of the closed space (or virtual zone) and clean the interior of the closed space (or virtual zone). The present disclosure does not limit the detailed cleaning processes performed by the cleaning robot 100 for cleaning the interior of the closed space (or virtual zone).

Figure 4:
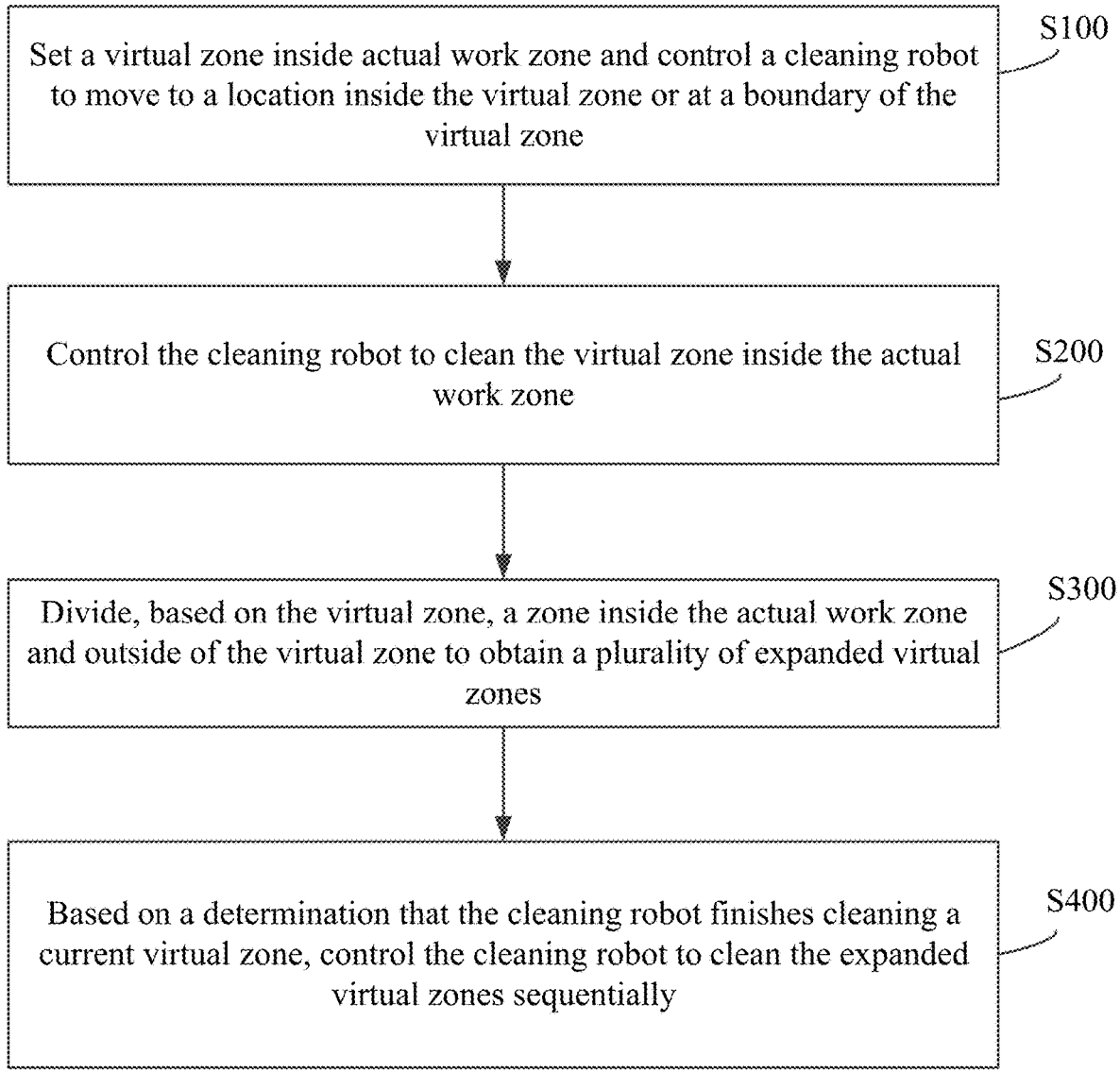
FIG. 4 illustrates a flowchart showing processes of a localization and mapping algorithm executable by the cleaning robot, according to an embodiment of the present disclosure.

According to an embodiment of the disclosed cleaning robot 100, a localization and mapping algorithm executed by the cleaning robot 100 is shown in FIG. 4. In addition to including the steps S100 and S200, the localization and mapping algorithm may also include instructions for the following operations:

Step S300: dividing, based on the virtual zone, a zone inside the actual work zone and outside of the virtual zone to obtain a plurality of expanded virtual zones.

Step S400: based on a determination that the cleaning robot 100 finishes cleaning a current virtual zone, controlling the cleaning robot 100 to move inside the expanded virtual zones and clean the expanded virtual zones sequentially.

Figure 5:
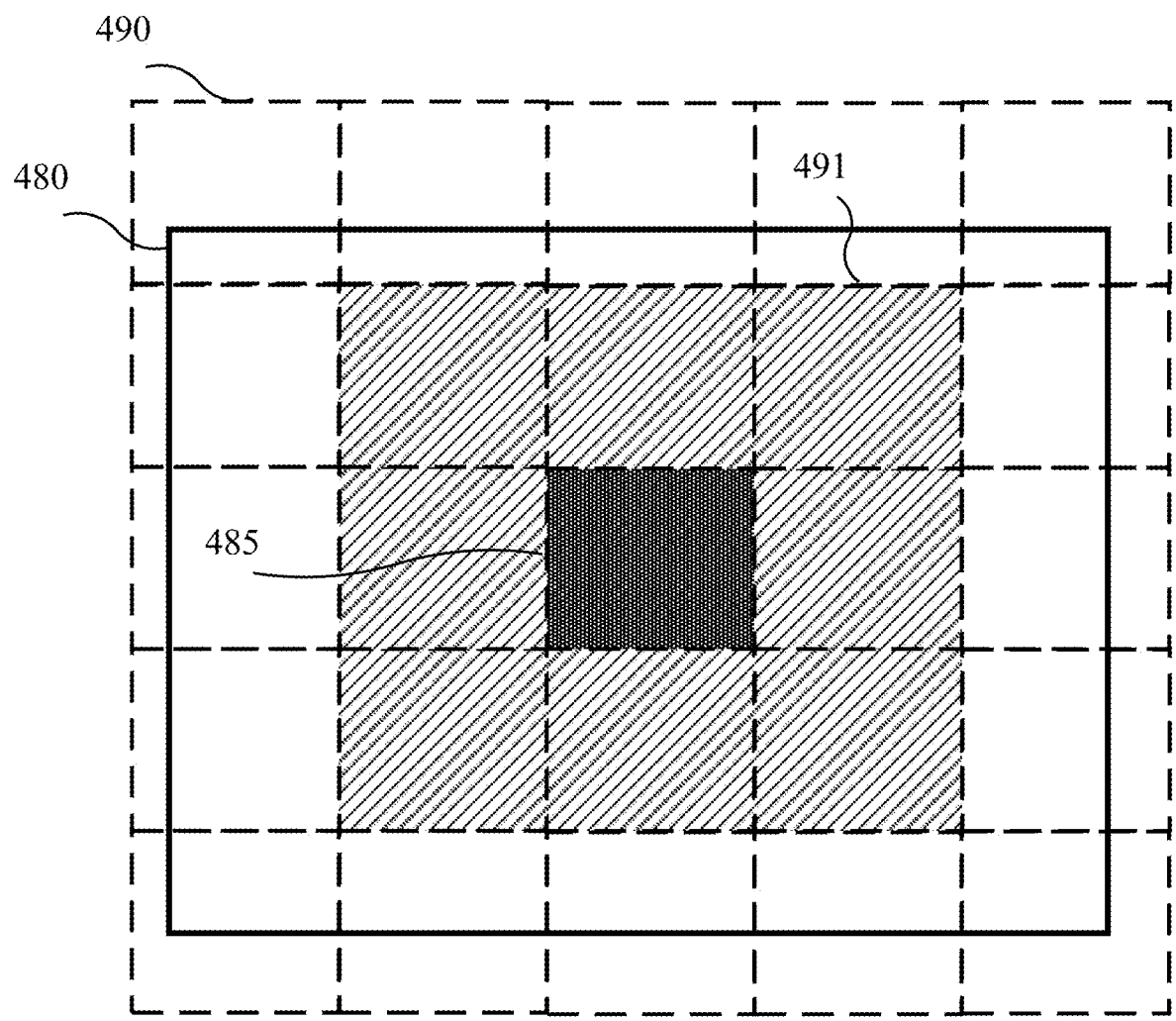
FIG. 5 illustrates a schematic diagram of a plurality of expanded virtual zones for the cleaning robot, according to an embodiment of the present disclosure.

FIG. 5 illustrates a schematic diagram of a plurality of expanded virtual zones for the cleaning robot, according to an embodiment of the present disclosure. As shown in FIG. 5, the zone enclosed by solid lines is an actual work zone 480, the center zone with a darker color and dense grids is a virtual zone 485, and other zones enclosed by dashed lines are expanded virtual zones. The squares filled with slant grids represent expanded virtual zones 491 (or inner expanded virtual zones). The unfilled squares represent expanded virtual zones 490 (or outer expanded virtual zones). In some embodiments, the expanded virtual zones may be obtained by replicating the virtual zone 485 in a zone located inside the actual work zone 480 and outside of the virtual zone 485. As shown in FIG. 5, replicating the virtual zone 485 in the zone inside the work zone 480 may generate the expanded virtual zones 491 that are fully inside the work zone 480, and the expanded virtual zones 490 that are partially inside the work zone 480 and partially outside of the zone 480. In some embodiments, the expanded virtual zones 491 and 490 may form multiple layers of zones, such as a first layer of expanded virtual zones (formed by expanded virtual zones 491 represented by squares filled with slant lines in FIG. 5) and a second layer of expanded virtual zones (formed by expanded virtual zones 490 represented by unfilled squares in FIG. 5). In some embodiments, one or more expanded virtual zones of the first layer of expanded virtual zones 491 that are closest to the virtual zone 485 may share one or more boundaries with the virtual zone 485. In some embodiments, at least portions of outer expanded virtual zones 490 and inner expanded virtual zones 491 may share one or more boundaries. Therefore, the virtual zone 485 and the multiple layers of expanded virtual zones 490 and 491 may fully cover the actual work zone 480. When the virtual zone 485 and the expanded virtual zones 490 and 491 are cleaned by the cleaning robot 100, the entire actual work zone 480 is cleaned.

In step S400, controlling the cleaning robot 100 to clean the expanded virtual zones 490 and 491 sequentially may include: based on distances between the expanded virtual zones 490 and 491 and a current location of the cleaning robot 100 when the cleaning robot 100 finishes cleaning the current virtual zone 485, determining a first expanded virtual zone from the expanded virtual zones 490 and 491 to be cleaned subsequently. For example, the data processing device 125 may select the first expanded virtual zone to be cleaned subsequently as one that is closest to the current location of the cleaning robot 100. The data processing device 125 may control the cleaning robot 100 to clean the interior of the first expanded virtual zone. In some embodiments, when the cleaning robot 100 finishes cleaning the first expanded virtual zone, the data processing device 125 may determine a second expanded virtual zone from the remaining expanded virtual zones 490 and 491 to be cleaned subsequently. For example, the data processing device 125 may determine the second expanded virtual zone as one that is closest to a new current location of the cleaning robot 100 (i.e., the location of the cleaning robot 100 when the cleaning robot 100 finishes cleaning the first expanded virtual zone). The same processes may be repeated until all of the virtual zones (including expanded virtual zones) have been cleaned.

In the present disclosure, the actual work zone 480 is divided into multiple virtual zones 485, 490, and 491 that can cover the entire actual work zone 480. The interior of each virtual zone (including each expanded virtual zone) is cleaned sequentially. Through the disclosed technical solution, the cleaning robot 100 can achieve a high cleaning efficiency for an unknown work zone.

In the cleaning robot 100 of the present disclosure, by including a camera mounted at the front portion of the cleaning robot 100 at an acute elevation angle, the number of types of features that can be extracted from captured images is increased. The accuracy of the vision-based localization and mapping of the cleaning robot 100 is enhanced, thereby improving the path planning/navigation effects and avoiding the low efficiency associated with a random cleaning mode. In the meantime, the object recognition effect and the object avoidance effect are improved. Moreover, the camera may be a monocular camera having a simple structure and a low cost. As a result, the disclosed cleaning robot 100 can achieve highly efficient cleaning at a low cost. Furthermore, the disclosed cleaning robot 100 can realize other functions such as object recognition, facial recognition, real time surveillance, security surveillance, etc., thereby expanding the applications of the cleaning robot 100. The cleaning robot 100 of the present disclosure is configured to execute a localization and mapping algorithm for realizing SLAM (e.g., visual SLAM or VSLAM) of the cleaning robot 100. When an initial map for an unknown environment is not available, the cleaning robot 100 may divide an actual work zone into multiple virtual zones (including expanded virtual zones) that cover the entire actual work zone. Based on the images captured by the monocular camera 115, the data processing device 125 may control the cleaning robot 100 to move inside the virtual zones while cleaning the interior of the virtual zones sequentially, thereby realizing highly efficient cleaning of the unknown work zone.

In some embodiments, the present disclosure may provide a method for controlling a movement and/or an operation of a cleaning robot for cleaning a floor. The method may be performed by the data processing device 125. The method may include controlling the cleaning robot 100 to move in a first cleaning direction. The method may also include based on a determination that the cleaning robot 100 encounters an obstacle, controlling the cleaning robot 100 to turn and move along a periphery of the obstacle. The method may also include while controlling the cleaning robot 100 to move along the periphery of the obstacle, computing a projected distance of a moving path along the periphery of the obstacle projected in a direction perpendicular to the first cleaning direction. The method may further include based on a determination that the projected distance is greater than or equal to a predetermined deviation distance, controlling the cleaning robot 100 to turn to a second cleaning direction, and to move in the second cleaning direction. Detailed descriptions of the above processes can refer to the descriptions rendered in connection with FIG. 3I.

In some embodiments, the method may also include recognizing feature information included in at least two images captured by a camera of the cleaning robot. The at least two images may be captured by the monocular camera 115 configured with an optical axis of a lens of the monocular camera 115 forming an acute elevation angle β with respect to the forward moving direction 150 of the cleaning robot 100. The method may also include computing displacements and poses of the cleaning robot based on the one or more motion parameters obtained by one or more motion sensors of the cleaning robot at time instances when the at least two images are captured and based on the feature information. The method may further include computing a location of the cleaning robot at each time instance when each of the at least two images is captured.

In some embodiments, the method may also include while controlling the cleaning robot to move along the periphery of the obstacle, computing a second projected distance of the moving path along the periphery of the obstacle projected in the first cleaning direction. The method may further include determining whether a sum of the second projected distance and a distance traversed by the cleaning robot in the first cleaning direction is equal to a greater than a predetermined distance. In some embodiments, the method may further include, based on a determination that the sum is equal to or greater than the predetermined distance, controlling the cleaning robot to turn to a deviation direction, and to move in the deviation direction for a predetermined deviation distance.

Any of the steps, operations, or processes described herein may be performed or implemented with one or more hardware and/or software modules, alone or in combination with other devices. In one embodiment, a software module is implemented with a computer program product including a non-transitory computer-readable medium containing computer program codes or instructions, which can be executed by a computer processor (e.g., the data processing device 125) for performing any or all of the steps, operations, or processes described herein. In some embodiments, a hardware module may include hardware components such as a device, a system, a processor, a controller, an electrical circuit, a logic gate, etc. The non-transitory computer-readable medium may be a memory, a hard disk, a magnetic disk, an optical disk, etc. The memory may be a read-only memory ("ROM"), a random-access memory ("RAM"), a flash memory, an Electrically Programmable read only memory ("EPROM"), or an Electrically Erasable Programmable read only memory ("EEPROM").

Further, when an embodiment illustrated in a drawing shows a single element, it is understood that the embodiment or another embodiment not shown in the figures but within the scope of the present disclosure may include a plurality of such elements. Likewise, when an embodiment illustrated in a drawing shows a plurality of such elements, it is understood that the embodiment or another embodiment not shown in the figures but within the scope of the present disclosure may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one figure/embodiment but not shown in another figure/embodiment may nevertheless be included in the other figure/embodiment.

Various embodiments have been described to illustrate the exemplary implementations. Based on the disclosed embodiments, a person having ordinary skills in the art may make various other changes, modifications, rearrangements, and substitutions without departing from the scope of the present disclosure. Thus, while the present disclosure has been described in detail with reference to the above embodiments, the present disclosure is not limited to the above described embodiments. The present disclosure may be embodied in other equivalent forms without departing from the scope of the present disclosure. The scope of the present disclosure is defined in the appended claims.

What is claimed is:

1. A cleaning robot, comprising:
   an exterior housing;
   one or more motion devices configured to move the cleaning robot in an environment;
   one or more motion sensors configured to obtain one or more motion parameters relating to a motion of the cleaning robot;
   a monocular camera configured to capture one or more images of the environment, wherein the monocular camera is disposed internal to a slant surface located at a front end of the exterior housing, the slant surface inclines upwardly with respect to a forward moving direction, the monocular camera and the slant surface face substantially a same direction, and a direction of the monocular camera forms an acute angle with the forward moving direction of the cleaning robot;
   a storage device configured to store data including at least one of the one or more images or the one or more motion parameters;
   one or more cleaning devices configured to clean a floor;
   a power source configured to provide an electric power to the cleaning robot; and
   a data processing device configured to execute a localization and mapping algorithm to:
      obtain the one or more images captured by the monocular camera and the one or more motion parameters obtained by the one or more motion sensors;
      perform localization, mapping, and path planning for the mobile device based on a localization and mapping algorithm;
      control the one or more motion devices to move the cleaning robot along a planned path,
      wherein when the data processing device controls the one or more motion devices to move the cleaning robot along the planned path, the data processing device is configured to:
         when the cleaning robot encounters an obstacle while moving in a first moving direction, control the one or more motion devices to move the cleaning robot along a periphery of the obstacle;

compute, in real time, a first projected distance of a moving path of along the periphery projected in a direction perpendicular to the first moving direction; and when the first projected distance is equal to or greater than a deviation distance, control the one or more motion devices to turn the cleaning robot to a direction opposite to the first moving direction to continue moving; or when the first projected distance is substantially equal to 0, control the one or more motion devices to turn the cleaning robot to the first moving direction to continue moving.

2. The cleaning robot of claim 1, wherein
the direction of the monocular camera coincides with a normal of the slant surface; and/or
the acute angle formed between the direction of the monocular camera and the forward moving direction of the cleaning robot is greater than 30° and less than 90°; and/or
a vertical field of view of the monocular camera is in a range of 50° to 100°.

3. The cleaning robot of claim 1, wherein the data processing device is also configured to execute the localization and mapping algorithm to:
recognize feature information included in at least two images captured by the monocular camera;
compute displacements and poses of the cleaning robot based on the one or more motion parameters obtained by the one or more motion sensors at time instances when the at least two images are captured and based on the feature information; and
compute a location of the cleaning robot at each time instance when each of the at least two images is captured.

4. The cleaning robot of claim 1, further comprising:
a collision sensor disposed at the front end of the cleaning robot, and configured to transmit a collision signal to the data processing device when detecting a collision with the obstacle,
wherein the data processing device is also configured to execute the localization and mapping algorithm to:
determine a location of the obstacle based on the collision signal and a location of the cleaning robot at a time instance when the cleaning robot collides with the obstacle; and
build a map of a work zone based on the location of the obstacle.

5. The cleaning robot of claim 1, further comprising a distance sensor configured to detect the obstacle and transmit a relative position of the obstacle relative to the cleaning robot to the data processing device,
wherein the data processing device is also configured to execute the localization and mapping algorithm to:
determine a location of the obstacle based on the relative position of the obstacle transmitted from the distance sensor and a location of the cleaning robot at a time instance when the distance sensor obtains the relative position of the obstacle; and
build a map of a work zone based on the location of the obstacle.

6. A non-transitory computer-readable storage medium storing computer-executable instructions, which when executed by a processor of a cleaning robot, are configured to cause the processor to perform a method comprising:
controlling the cleaning robot to move in a first moving direction from a starting location;
while controlling the cleaning robot to move, obtaining one or more images captured by a monocular camera of the cleaning robot and one or more motion parameters obtained by one or more motion sensors of the cleaning robot;
determining that the cleaning robot encounters an obstacle while the cleaning robot moves in the first moving direction;
controlling the cleaning robot to move along a periphery of the obstacle;
computing, in real time, a first projected distance of a moving path of along the periphery projected in a direction perpendicular to the first moving direction; and
when the first projected distance is equal to or greater than a deviation distance, controlling the cleaning robot to turn to a direction opposite to the first moving direction to continue moving; or when the first projected distance is substantially equal to 0, controlling the cleaning robot to turn to the first moving direction to continue moving.

7. The non-transitory computer-readable storage medium of claim 6, wherein the method further comprises:
recognizing feature information included in at least two images captured by the monocular camera;
computing displacements and poses of the cleaning robot based on the one or more motion parameters obtained by the one or more motion sensors at time instances when the at least two images are captured and based on the feature information; and
computing a location of the cleaning robot at each time instance when each of the at least two images is captured.

8. The non-transitory computer-readable storage medium of claim 6, wherein the method further comprises:
determining a location of the obstacle based on a collision signal of the cleaning robot and a location of the cleaning robot at a time instance when the cleaning robot collides with the obstacle; and
building a map of a work zone based on the location of the obstacle.

9. The non-transitory computer-readable storage medium of claim 6, wherein the method further comprises:
determining a location of the obstacle based on a relative position of the obstacle transmitted from a distance sensor and a location of the cleaning robot at a time instance when the distance sensor obtains the relative position of the obstacle; and
building a map of a work zone based on the location of the obstacle.

* * * * *